US008352766B2

(12) United States Patent
Maruyama et al.

(10) Patent No.: US 8,352,766 B2
(45) Date of Patent: *Jan. 8, 2013

(54) POWER CONTROL OF TARGET SECONDARY COPY STORAGE BASED ON JOURNAL STORAGE USAGE AND ACCUMULATION SPEED RATE

(75) Inventors: Tetsuya Maruyama, Yokohama (JP);
Masayasu Asano, Yokohama (JP);
Nobumitsu Takaoka, Yokohama (JP);
Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/337,356

(22) Filed: Dec. 27, 2011

(65) Prior Publication Data
US 2012/0110358 A1    May 3, 2012

Related U.S. Application Data

(63) Continuation of application No. 12/013,641, filed on Jan. 14, 2008, now Pat. No. 8,086,881.

(30) Foreign Application Priority Data

May 17, 2007 (JP) ................................. 2007-131282

(51) Int. Cl.
*G06F 1/32* (2006.01)
*G06F 12/16* (2006.01)
(52) U.S. Cl. .. 713/320; 711/161; 711/162; 711/E12.103
(58) Field of Classification Search ....................... None
See application file for complete search history.

(56) References Cited

U.S. PATENT DOCUMENTS

| 7,152,079 | B2 | 12/2006 | Hirakawa et al. | |
|---|---|---|---|---|
| 7,275,138 | B2 * | 9/2007 | Saika | 711/154 |
| 7,330,946 | B2 * | 2/2008 | Ikegaya et al. | 711/162 |
| 7,386,755 | B2 | 6/2008 | Eguchi et al. | |
| 7,398,363 | B2 | 7/2008 | Innan et al. | |
| 7,464,236 | B2 * | 12/2008 | Sano et al. | 711/162 |
| 7,725,445 | B2 | 5/2010 | Hirakawa et al. | |
| 7,870,093 | B2 | 1/2011 | Eguchi et al. | |
| 2005/0073887 | A1 | 4/2005 | Hirakawa et al. | |
| 2005/0111249 | A1 | 5/2005 | Yagisawa et al. | |
| 2006/0095696 | A1 * | 5/2006 | Amano et al. | 711/162 |
| 2006/0193073 | A1 | 8/2006 | Hakamata et al. | |
| 2007/0079088 | A1 | 4/2007 | Deguchi et al. | |

(Continued)

FOREIGN PATENT DOCUMENTS
JP    2000-293314    10/2000
(Continued)

*Primary Examiner* — Kenneth Kim
(74) *Attorney, Agent, or Firm* — Antonelli, Terry, Stout & Kraus, LLP.

(57) ABSTRACT

Arrangements having multiple second storage systems which each include a restore control unit for controlling restoration processing, in which a data element in a journal stored in a journal storage area is written into a secondary logical volume, and a storage device control unit for controlling a storage device in the second storage system. The restore control unit is provided with a function for suspending the restoration processing. A first value indicating the usage condition of the journal storage area in the second storage system is obtained, and the restore control unit suspends the restoration processing in accordance with the obtained first value. The storage device control unit then executes power saving on a storage device relating to the secondary logical volume.

18 Claims, 18 Drawing Sheets

U.S. PATENT DOCUMENTS

| | | |
|---|---|---|
| 2007/0180211 A1 | 8/2007 | Takaoka et al. |
| 2008/0266698 A1 | 10/2008 | Shibayama et al. |

FOREIGN PATENT DOCUMENTS

| | | |
|---|---|---|
| JP | 2005-018506 | 1/2005 |
| JP | 2005-157710 | 6/2005 |
| JP | 2005-222110 | 8/2005 |
| JP | 2007-102579 | 4/2007 |

\* cited by examiner

FIG. 5

241 STORAGE VOLUME TABLE

| VOL# | VDEV# | RAID GROUP# | CAPACITY |
|---|---|---|---|
| 1 | 001 | 01 | 40GB |
| 2 | 002 | 01 | 40GB |
| 3 | 003 | 01 | 40GB |
| 20 | 010 | 02 | 40GB |
| 21 | 011 | 02 | 40GB |

242 STORAGE TABLE

| STORAGE ID | IP ADDRESS |
|---|---|
| 001 | 111.222.222.xxx |
| 002 | 111.222.222.xxx |

611, 612

243 JOURNAL TABLE

244 PAIR TABLE

341 STORAGE TABLE

342 THRESHOLD TABLE

FIG. 11

343 COPY PAIR TABLE

| PAIR ID | PAIR STATUS | PRIMARY DATA VOLUME | | | SECONDARY DATA VOLUME | | |
|---|---|---|---|---|---|---|---|
| | | STORAGE ID | VOL# | JOURNAL ID | STORAGE ID | VOL# | JOURNAL ID |
| 1 | NORMAL | 01 | 1 | 001 | 02 | 1 | 001 |
| 2 | NORMAL | 01 | 2 | 001 | 02 | 2 | 001 |
| 3 | NORMAL | 01 | 3 | 001 | 02 | 3 | 001 |

344 COPY JOURNAL TABLE

| JOURNAL PAIR ID | S-VOL STATE | PRIMARY JOURNAL VOLUME | | SECONDARY JOURNAL VOLUME | |
|---|---|---|---|---|---|
| | | STORAGE ID | JOURNAL ID | STORAGE ID | JOURNAL ID |
| 1 | ACTIVATED | 01 | 001 | 02 | 001 |
| 2 | SUSPENDED | 01 | 002 | 02 | 002 |

1211, 1212, 1213, 1214, 1215, 1216

345 JOURNAL INCREASING PACE THRESHOLD TABLE

| JOURNAL ID (1711) | INCREASE SPEED LOWER THRESHOLD (1712) | INCREASE SPEED UPPER THRESHOLD (1713) |
|---|---|---|
| 001 | 3MB/s | 10MB/s |
| 002 | 5MB/s | 10MB/s |

POWER CONTROL OF TARGET SECONDARY COPY STORAGE BASED ON JOURNAL STORAGE USAGE AND ACCUMULATION SPEED RATE

CROSS REFERENCE TO RELATED APPLICATION

This is a continuation of U.S. application Ser. No. 12/013,641, filed Jan. 14, 2008 now U.S. Pat. No. 8,086,881. This application relates to and claims priority from Japanese Patent Application No. 2007-131282, filed on May 17, 2007. The entirety of the contents and subject matter of all of the above is incorporated herein by reference.

BACKGROUND

The present invention relates to power saving in a storage system.

For example, a remote copying technique disclosed in Japanese Unexamined Patent Application Publication 2005-18506 is known. In Japanese Unexamined Patent Application Publication 2005-18506, a first storage system receives a data element transmitted from an upper order device, creates a journal including the data element, which is written in a primary logical volume, and transmits the journal to a second storage system. The second storage system receives the journal from the first storage system, and writes the received journal in a journal storage area. The second storage system writes data elements included in accumulated journals in the journal storage area to a secondary logical volume. By means of this series of processes, a copy of the data in the primary logical volume is generated in the secondary logical volume.

Further, power saving techniques disclosed in Japanese Unexamined Patent Application Publication 2000-293314 and Japanese Unexamined Patent Application Publication 2005-157710 are known. According to Japanese Unexamined Patent Application Publication 2000-293314, when a fixed time period elapses following the end of access from an upper order device, a storage system performs a power saving operation to shift the non-accessed storage device to a power saving mode or switch the power of the storage device OFF. According to Japanese Unexamined Patent Application Publication 2005-157710, a storage system cuts the power of a storage device in response to an instruction from an upper order device when the upper order device has no intention of accessing the storage device for a certain time period.

When an attempt is made to reduce the power consumption of a storage system in remote copying technology, power saving in the first storage system can be achieved using the power saving technique described in Japanese Unexamined Patent Application Publication 2000-293314 or Japanese Unexamined Patent Application Publication 2005-157710, for example. The reason for this is that in Japanese Unexamined Patent Application Publication 2000-293314 and Japanese Unexamined Patent Application Publication 2005-157710, the power consumption of the storage device is reduced on the basis of access or a command from the upper order device, and in remote copying technology, the primary logical volume in the first storage system typically serves as the access destination of the upper order device.

From this viewpoint, however, the power saving techniques disclosed in Japanese Unexamined Patent Application Publication 2000-293314 and Japanese Unexamined Patent Application Publication 2005-157710 cannot be applied easily to the second storage system. The reason for this is that unlike the primary logical volume, the secondary logical volume in the second storage system does not usually serve as an access destination of the upper order device, and moreover, the remote copying disclosed in Japanese Unexamined Patent Application Publication 2005-18506 is so-called asynchronous remote copy, or more specifically remote copying that is executed asynchronously in relation to access to the primary logical volume by the upper order device.

SUMMARY

It is therefore an object of the present invention to achieve a reduction in the power consumption of a storage system serving as a target during remote copying.

Further objects of the present invention will become apparent from the following description.

A second storage system comprises a restore control unit for controlling restoration processing in which a data element in a journal stored in a journal storage area is written to a secondary logical volume, and a storage device control unit for controlling a storage device in the second storage system. The restore control unit is provided with a function for suspending restoration processing. A first value indicating a usage condition of the journal storage area in the second storage system is obtained, and the restore control unit suspends restoration processing in accordance with the obtained first value. The storage device control unit then executes power saving on the storage device relating to the secondary logical volume.

BRIEF DESCRIPTION OF THE DRAWINGS

FIG. 5 shows an example of the configuration of a storage volume table;

FIG. 6 shows an example of the configuration of a storage table;

FIG. 11 shows an example of the configuration of a copy pair table;

FIG. 12 shows an example of the configuration of a copy journal table;

DETAILED DESCRIPTION OF THE PREFERRED EMBODIMENT

Figure 1:
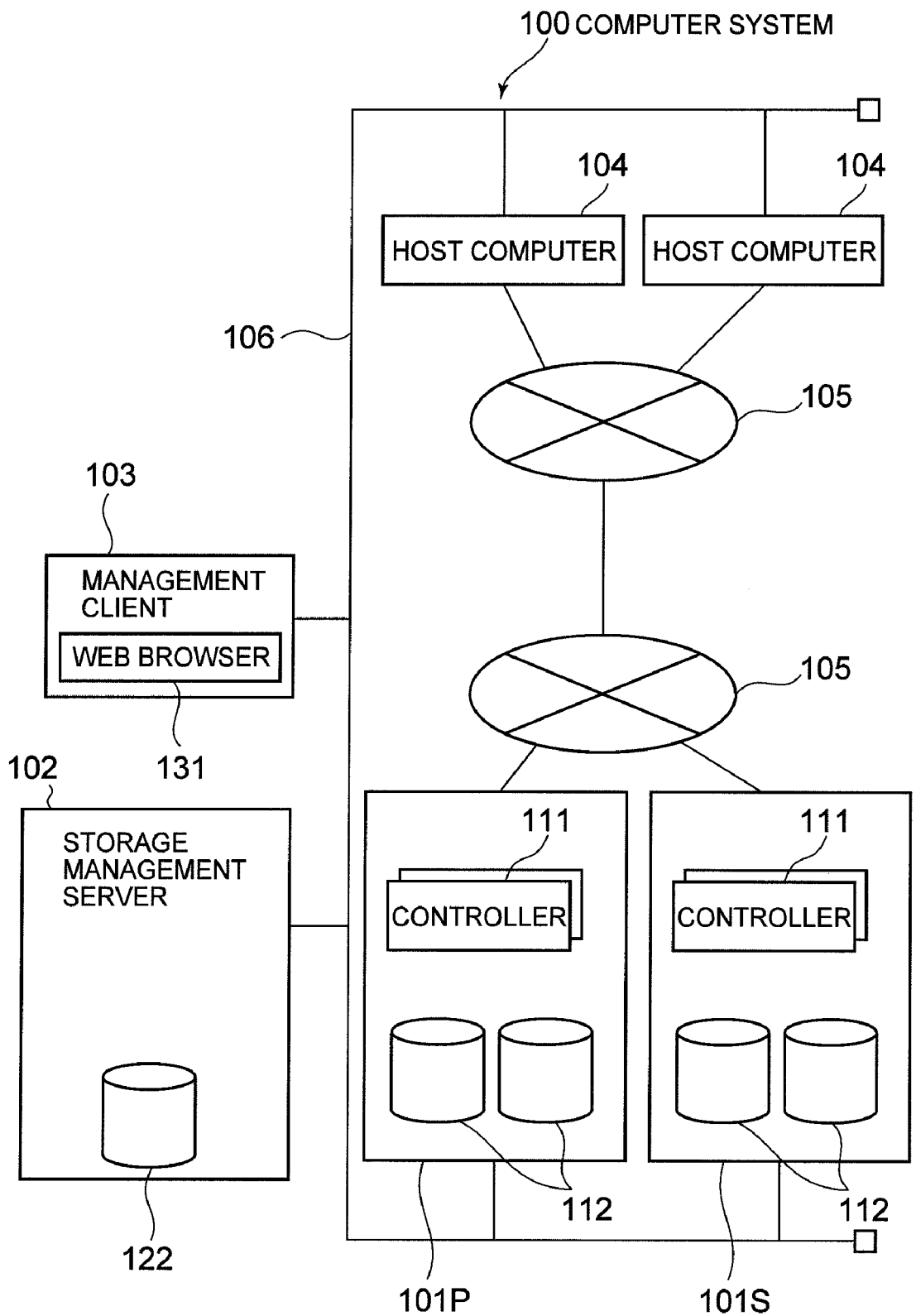
FIG. 1 shows an example of the configuration of a computer system according to a first embodiment of the present invention.

In an embodiment, a second storage system for receiving a journal including a data element that is written in a primary logical volume provided in a first storage system from the first storage system comprises: a reception unit for receiving a command; a journal storage area; a plurality of storage devices; a plurality of logical volumes, including a secondary logical volume, formed on the basis of a storage space of the plurality of storage devices; a journal update unit for writing the journal received from the first storage system into the journal storage area; a restore control unit for executing restoration processing, in which the data element in the journal stored in the journal storage area is written into the secondary logical volume; and a storage device control unit for controlling the storage devices. A management device for managing the second storage system comprises: a first acquisition unit for obtaining a first value indicating a usage condition of the journal storage area; and a command unit for transmitting to the second storage system a power saving command for reducing the power consumption of a storage device relating to the secondary logical volume in accordance with the obtained first value. In the second storage system, the reception unit receives the power saving command from the management device, the restore control unit suspends the restoration processing in response to reception of the power saving command, and the storage device control unit executes power saving on the storage device relating to the secondary logical volume after the restoration processing is suspended.

A single journal storage area may be a collection of one or more logical volumes formed on the basis of the storage space of two or more storage devices, or a combination of a collection of one or more logical volumes and a memory area, for example.

The usage condition may be a condition indicating the number of non-restoration processed journals in the journal storage area (in other words, an available storage area-related condition indicating the number of journals that can be written into the journal storage area).

Further, executing power saving may involve turning the power of the storage device OFF or reducing the rotation speed of a disk-type storage medium, for example.

The first value may be obtained in response to an enquiry or calculated using a value obtained in response to an enquiry. Further, the first value may be the total amount of journals that have not undergone restoration processing, or a proportion of the total amount (a proportion of the storage capacity of the journal storage area).

In an embodiment, the command unit is able to transmit the power saving command when the obtained first value is equal to or lower than a first threshold.

In an embodiment, the command unit is able to transmit a power saving cancellation command for canceling power saving in the storage device relating to the secondary logical volume to the second storage system when the obtained first value is equal to or higher than a second threshold. In the second storage system, the reception unit is capable of receiving the power saving cancellation command, and the storage device control unit is capable of canceling power saving in the storage device relating to the secondary logical volume in response to reception of the power saving cancellation command. Canceling power saving may involve turning the power of the storage device ON or increasing the rotation speed of a disk-type storage medium, for example.

In an embodiment, the restore control unit is capable of resuming the restoration processing after power saving in the storage device relating to the secondary logical volume is cancelled.

In an embodiment, the management device further comprises a second acquisition unit for obtaining a second value, which is a value relating to a total amount of journals added to the journal storage area per unit time. The command unit is capable of transmitting the power saving command in accordance with the obtained first value and second value.

The second value may be a journal update pace to the journal storage area, a journal receive pace of the second storage system, a journal transfer speed from the first storage system, or a data update pace to the primary logical volume, for example.

In an embodiment, the command unit is capable of transmitting the power saving command when the first value is equal to or lower than a third threshold and the second value is equal to or lower than a fourth threshold.

In an embodiment, the command unit is capable of transmitting the power saving cancellation command when the first value is equal to or higher than a fifth threshold or the second value is equal to or higher than a sixth threshold.

In an embodiment, the plurality of logical volumes include a plurality of secondary logical volumes corresponding to a plurality of journal storage areas. When a specific logical volume relates to a storage device in which power saving is executed in accordance with the received power saving command, the storage device control unit is able to refrain from executing power saving in the storage device.

In an embodiment, the plurality of logical volumes include a plurality of secondary logical volumes corresponding to a plurality of journal storage areas. Two or more secondary logical volumes related to a single storage device are associated with a single journal storage area.

In an embodiment, the second storage system is provided in a plurality. The plurality of second storage systems include a plurality of journal storage areas and a plurality of secondary logical volumes corresponding to the plurality of journal storage areas and a single primary logical volume. The first acquisition unit obtains the first value for each of the plurality of journal storage areas. In accordance with the obtained first value, the command unit is capable of transmitting a power saving command for reducing the power consumption of a storage device relating to a secondary logical volume that corresponds to a journal storage area corresponding to the first value to a second storage system having the journal storage area.

Two or more of the plurality of embodiments described above may be combined. The aforementioned first, third, and seventh thresholds may be used as a lower threshold to be described below, and the aforementioned second, fifth, and eighth thresholds may be used as an upper threshold to be described below. The aforementioned fourth and ninth thresholds may be used as an increase lower threshold to be described below, and the aforementioned sixth and tenth thresholds may be used as an increase upper threshold to be described below.

Each of the units described above (for example, the journal update unit, restore control unit, storage device control unit, first acquisition unit, command unit, and second acquisition unit) may be constructed using hardware, a computer program, or a combination thereof (the combination being realized partly by a computer program and partly by hardware, for example). The computer program is read and executed by a predetermined processor. Further, during information processing performed when the computer program is read by the processor, a storage area existing on a hardware resource such as memory may be used in an appropriate manner. Furthermore, the computer program may be installed on a computer from a recording medium such as a CD-ROM, or downloaded onto a computer via a communication network.

Several embodiments of the present invention will be described in detail below with reference to the drawings.

First Embodiment

FIG. 1 shows an example of the configuration of a computer system.

A plurality of host computers 104 (or one host computer 104) and a plurality of storage systems 101P, 101S are connected to a storage network (a SAN (Storage Area Network), for example) 105. 101P is the reference symbol of a primary storage system (source storage system) during remote copying, and 101S is the reference symbol of a secondary storage system (target storage system) during remote copying. Hereafter, when there is no need to differentiate between 101P and 101S, the shared part thereof, i.e. "101", will be used as a reference symbol.

The plurality of storage systems 101P, 101S, a storage management server 102, a management client 103, and the plurality of host computers 104 (or the single host computer 104) are connected to a management network (a LAN (Local Area Network), for example) 106. The management network 106 and storage network 105 are both communication networks, and may be constituted by a single communication network.

The host computer 104 is a computer comprising a CPU and memory, such as a workstation system, a mainframe computer, or a personal computer, for example. The host computer 104 is capable of executing various types of business processing (for example, database processing, Web application processing, streaming processing, and so on) using storage resources (for example, a primary data volume) provided by the storage system 101P.

The storage system 101 comprises one or more controllers 111 and a plurality of storage devices 112.

The controller 111 is capable of controlling access to a storage device 112 serving as a configuration element of a RAID group (Redundant Array of Independent (or Inexpensive) Disks) in accordance with the RAID level (prescribed in the RAID system) of the RAID group. According to the RAID system, two or more of the plurality of storage devices 112 are managed as a single RAID group. For example, a single RAID group can be configured by grouping together four of the storage devices 112 in a single group or grouping together eight of the storage devices 112 in a single group. In other words, a RAID group is configured by converging the storage areas provided respectively by two or more of the storage devices 112.

One or more logical volumes, each logical volume being a unit of access from the host computer 104, are defined on the basis of the storage space of the RAID group. Examples of logical volume types include data volumes and journal volumes. A data volume is a logical volume in which a data element used by the host computer 104 is stored. The data volume may be a primary data volume serving as a source or a secondary data volume serving as a target. A journal volume is a logical volume stored with a journal, which is information including a data element. A journal volume is constituted by one or more logical volumes. In this embodiment, a primary journal volume and a secondary journal volume are prepared. The primary journal volume is associated with one or more primary data volumes, and the secondary journal volume is associated with one or more secondary data volumes.

Further, the controller 111 executes power saving and power saving cancellation on the storage device 112. More specifically, for example, the controller 111 transmits a power saving command or a power saving cancellation command to the storage device 112.

The storage device 112 is a physical device having a function for performing a power saving operation or a power saving cancellation operation in response to the power saving command or power saving cancellation command. The storage device 112 may be of any type as long as this function is provided therein. More specifically, for example, the storage device 112 may be a disk drive (for example, a hard disk drive or a DVD (Digital Versatile Disk) drive) for driving a desktop storage medium, or a drive (for example, a flash memory drive) for driving another type of storage medium. Various interfaces, such as SATA (Serial ATA (Advanced Technology Attachment)), SAS (Serial Attached SCSI (Small Computer System Interface)), and FC (Fibre Channel), may be employed as an interface provided in the storage device 112.

The power saving operation involves turning a power source OFF, for example, while the power saving cancellation operation involves turning the power source ON, for example. However, the present invention is not limited thereto, and other types of power saving operation and/or power saving cancellation operation may be employed. As a power saving operation, for example, the storage device 112 may be switched to a so-called sleep mode in which the power of a part thereof is switched OFF, and the power saving cancellation operation may involve cancelling the sleep mode. Further, when the storage device 112 is a disk drive, spin-down processing, whereby a storage medium is rotated at a second rotation speed (for example, a speed of 0 or more) which is lower than a first rotation speed for performing writing and reading to and from the storage medium, may be performed as a power saving operation, and spin-up processing, whereby the rotation speed of the storage medium is increased from the second rotation speed to the first rotation speed, may be performed as the power saving cancellation operation, for example. Moreover, the power saving operation and power saving cancellation operation need not be two-stage processing (for example, switching a power source ON and OFF), and may be multi-stage processing (for example, instead of switching the power OFF immediately from a state in which the storage medium rotates at the first rotation speed, spin-down processing is performed, and after a while, the power is switched OFF).

In the following description, the storage device 112 is assumed to be a hard disk drive (HDD). Further, power saving will be referred to as "disk suspension", and power saving cancellation will be referred to as "disk activation".

The management client 103 is a computer for maintaining and managing the computer system 100. A manager is capable of maintaining and managing the computer system 100 by inputting a storage management command via a Web browser 131 installed in the management client 103. Examples of storage management commands include a command to increase or decrease the number of storage devices 112, a command instructing modification of the RAID configuration, and a command for setting a communication path between the host computer 104 and storage system 101. The input storage management command is transmitted from the management client 103 to the storage management server 102.

The storage management server 102 receives the storage management command from the management client 103, and executes processing corresponding to the command on the computer system 100 in response to the command. The storage management server 102 comprises a storage device 122 for storing information relating to the computer system 100 and so on. Note that when the storage system 101 functions as the storage management server 102, the storage management server 102 may be omitted. In this case, the storage management command is transmitted to the storage system 101 from the management client 103, and processing corresponding to the command is executed by a processor provided in the storage system 101.

Figure 2:
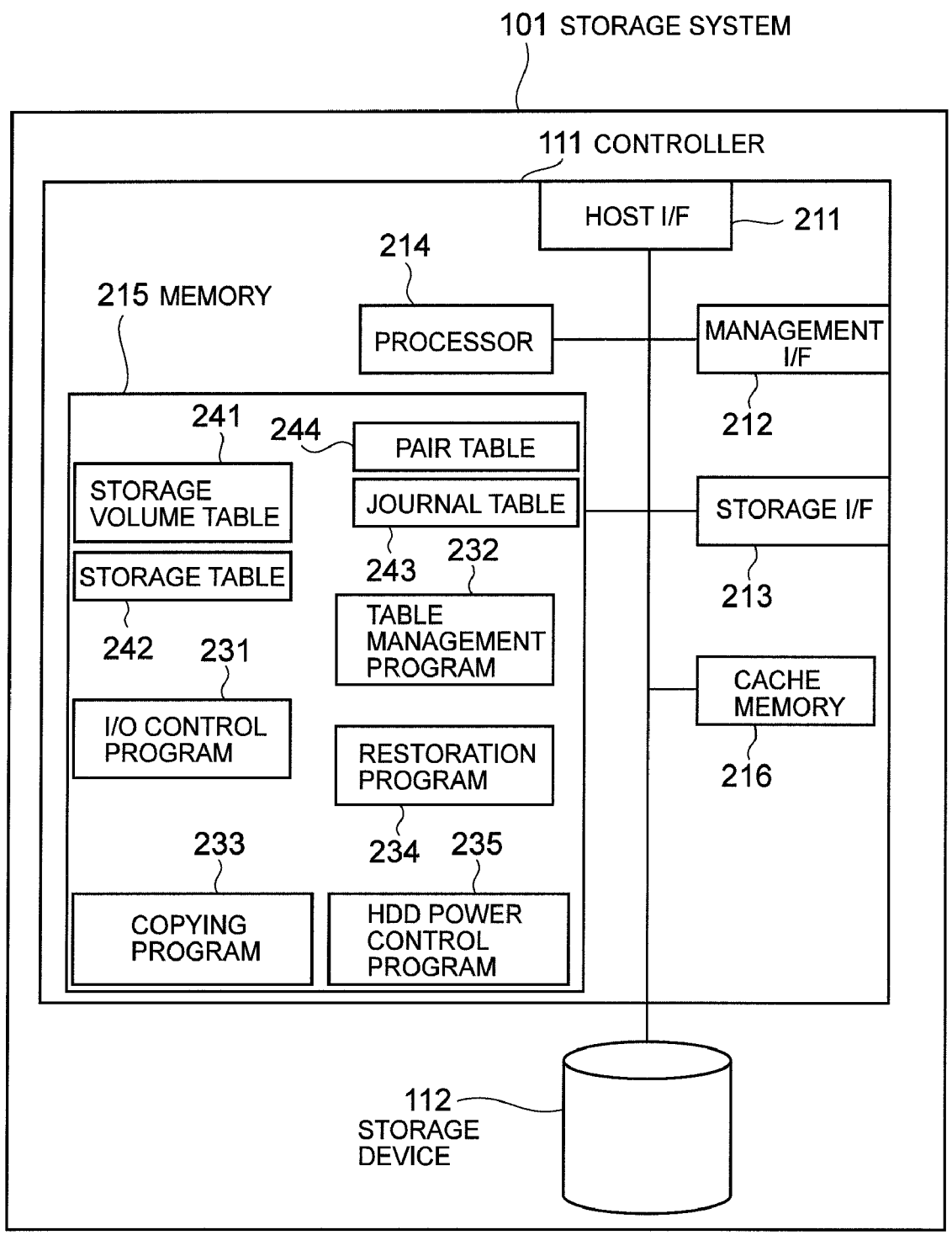
FIG. 2 shows an example of the configuration of a storage system.

FIG. 2 shows an example of the configuration of the storage system 101.

The controller 111 comprises a host interface (host I/F) 211, a management interface (management I/F) 212, a storage interface (storage I/F) 213, a processor 214, memory 215, and cache memory 216.

The host interface 211 is a network interface enabling connection to the host computer 104 via the storage network 105.

The management interface 212 is a network interface enabling connection to the storage management server 102 and management client 103 via the management network 106.

The storage interface 213 is a network interface enabling connection to another storage system 101 via the storage network 105.

The processor 214 controls data input into and output from the storage device 112 in response to a data input/output request (I/O request hereafter) from the host computer 104, and is realized by a CPU (Central Processing Unit), for example. In the following description, when a computer program in the storage system 101 is used as the subject of a sentence, it is assumed that in actuality, processing is performed by the processor 214 that executes the computer program.

The cache memory 216 stores data input into and output from the storage device 112 temporarily.

The memory 215 stores computer programs executed by the processor 214 and information that is referenced where appropriate when executing the computer programs. Examples of the computer programs include an I/O control program 231, a table management program 232, a copying program 233, a restoration program 234, and an HDD power control program 235. Further, examples of the referenced information include a storage volume table 241, a storage table 242, a journal table 243, and a pair table 244.

The I/O control program 231 is a program for controlling data input and output to and from the storage device 112 in response to an I/O request from the host computer 104.

The table management program 232 is a program for reading and writing information from and to the storage volume table 241, storage table 242, journal table 243, and pair table 244.

The copying program 233 is a remote copying program, and the processing performed thereby differs according to whether the processing is performed by the primary storage system 101P or the secondary storage system 101S.

The restoration program 234 is a program for writing a data element of a journal stored in a journal volume to a secondary data volume. In the following description, processing to write a data element stored in a journal volume to a secondary data volume will be referred to as "restoration processing".

The HDD power control program 235 transmits a disk suspension command or a disk activation command to a storage device 112 constituting a secondary data volume specified by the disk suspension command or disk activation command in response to a disk suspension command or disk activation command from the storage management server. Disk suspension indicates cutting the power of the storage device 112, for example, and disk activation means supplying power to the storage device 112, for example. Disk suspension may be spin-down processing for setting the rotation [speed] of the disk in the storage device 112 at the second rotation speed (0, for example) rather than cutting the power of the storage device 112. In this case, disk activation may be spin-up processing for setting the rotation speed of the disk at the first rotation speed.

Information indicating the relationship between a logical volume and the storage device 112 and information relating to the characteristics of the logical volume are recorded in the storage volume table 241. The storage volume table 241 will be described in detail later using FIG. 5.

Information relating to the respective storage systems 101 of the source and target during remote copying is recorded in the storage table 242. The storage table 242 will be described in detail later using FIG. 6.

Information relating to a journal volume and the logical volumes constituting the journal volume is recorded in the journal table 243. The journal table 243 will be described in detail later using FIG. 7.

Information relating to the association between the source volume (primary data volume) and target volume (secondary data volume) during remote copying is recorded in the pair table 244. The pair table 244 will be described in detail later using FIG. 8.

Figure 3:
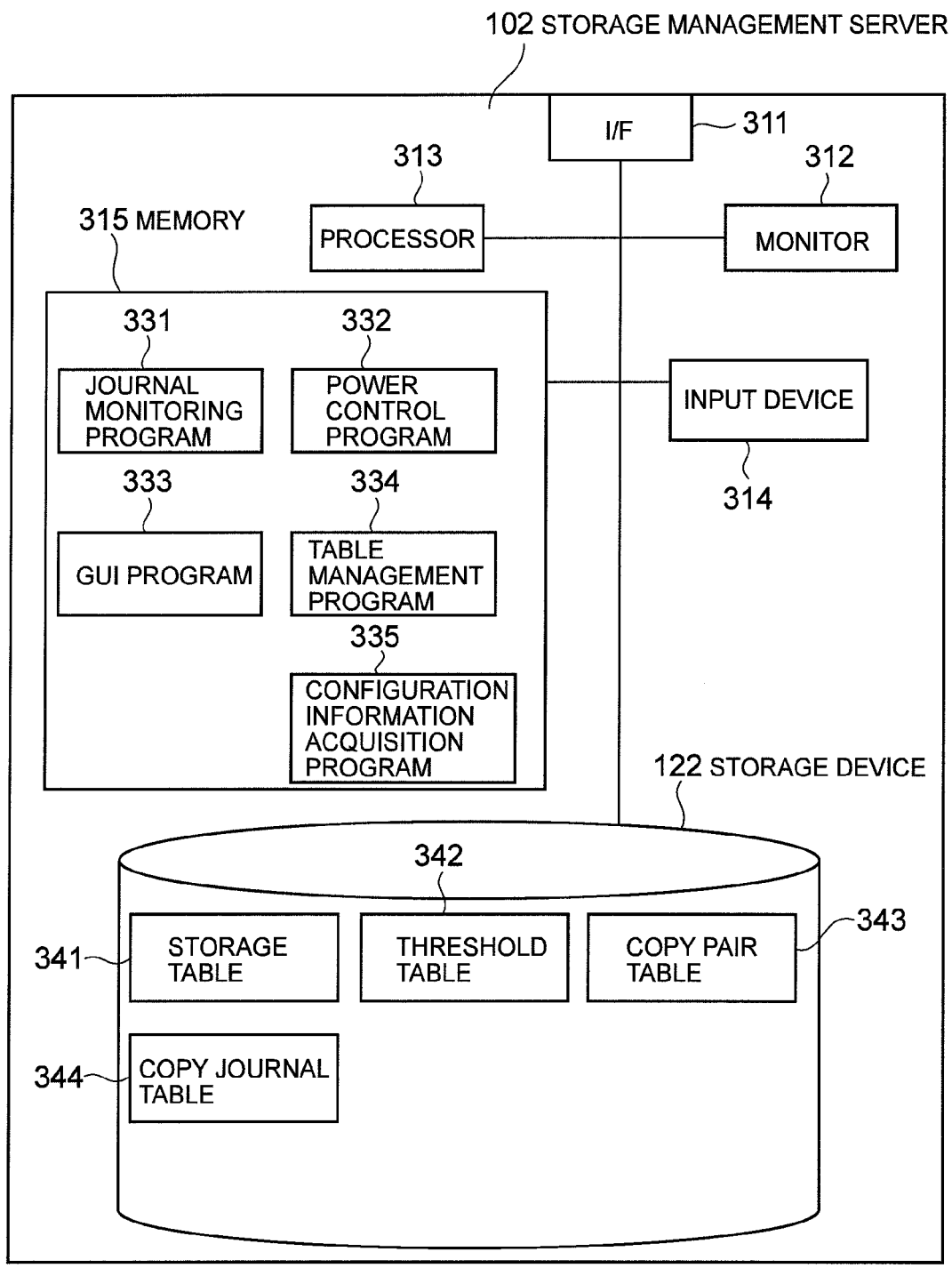
FIG. 3 shows an example of the configuration of a storage management server.

FIG. 3 shows an example of the configuration of the storage management server 102.

The storage management server 102 comprises an interface (I/F) 311, a monitor 312, a processor 313, an input device 314, memory 315, and a storage device 122.

The interface 311 is a device for connecting to the management network 106, such as a LAN adaptor, for example.

The monitor 312 is a display device for displaying a storage management GUI (Graphical User Interface), for example (information indicating the GUI may be transmitted to the management client 103 and displayed by the Web browser 131 of the management client 103). The input device 314 is used to input storage management commands, and takes the form of a keyboard, a mouse, or similar, for example. The monitor 312 and input device 314 may be omitted.

The processor 313 is a CPU, for example, for executing computer programs stored in the memory 315. In the following description, when a computer program in the storage management server 102 is used as the subject of a sentence, it is assumed that in actuality, processing is performed by the processor 313 that executes the computer program.

The memory 315 stores the computer programs that are executed by the processor 313. These computer programs include a journal monitoring program 331, a power control program 332, a GUI program 333, a table management program 334, and a configuration information acquisition program 335. Further, the storage device 122 stores a storage table 341 (see FIG. 9 for details), a threshold table 342 (see FIG. 10 for details), a copy pair table 343 (see FIG. 11 for details), and a copy journal table 344 (see FIG. 12 for details). Note that these tables may be stored in the memory 315 instead of the storage device 122.

The journal monitoring program 331 is a program for monitoring the journal store rate of the secondary journal volume in the secondary storage system 101.

The power control program 332 is a program for determining whether or not to perform disk suspension or disk activation on the basis of the monitoring result of the journal monitoring program 331, and transmitting a disk suspension command or disk activation command in accordance with the determination result.

The GUI program 333 is a program for displaying information relating to the storage system 101 on the monitor 312 and providing the manager with an interface for operating the storage management server 102. Note that another interface such as a command line interface may be provided instead of a GUI.

The table management program 334 is a program for managing the storage table 341, threshold table 342, copy pair table 343, and copy journal table 344 stored in the storage device 122.

The configuration information acquisition program 335 is a program for obtaining configuration information relating to the storage system 101 and host computer 104 via the management network 106.

Figure 4:
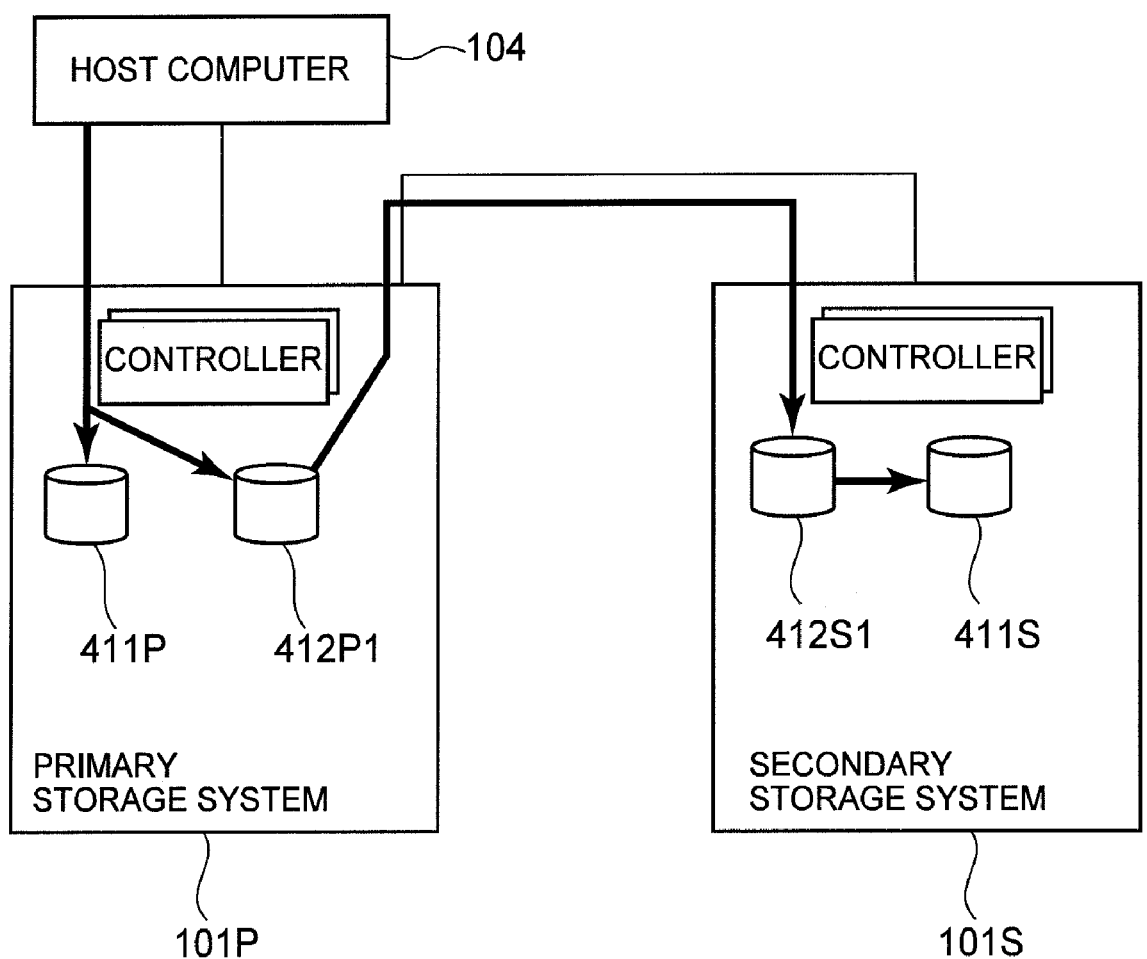
FIG. 4 is an illustrative view of remote copying.

FIG. 4 is an illustrative view of remote copying. Note that the arrows in FIG. 4 indicate directions in which a data element is transferred.

The primary storage system 101P includes a primary data volume 411P and a primary journal volume 412P1, while the secondary storage system 101S includes a secondary data volume 411S and a secondary journal volume 412S1. The primary data volume 411P and secondary data volume 411S form a copy pair, while the primary journal volume 412P1 and secondary journal volume 412S1 form a journal pair. The primary data volume 411P is associated with the primary journal volume 412P1 (the primary data volume of another copy pair may be associated with the primary journal volume 412P1), and the secondary data volume 411S is associated with the secondary journal volume 412S1 (the secondary data volume of another copy pair may be associated with the secondary journal volume 412S1).

The controller 111 of the primary storage system 101P receives a data element write request from the host computer 104. In response to the write request, the I/O control program 231 stores the writing subject data element corresponding to the write request in the cache memory 216 temporarily, and writes the data element stored in the cache memory 216 to the primary data volume 411P specified by write information (a LUN, for example) included in the write request. Further, the I/O control program 231 transmits a writing completion notification to the host computer 104 at the point in time when the data element is written into the cache memory 216 (or the primary data volume 411P). Further, concurrently with writing of the data element, the I/O control program 231 creates a journal of the information included in the data element, and writes the journal into the primary journal volume 412P1. In addition to the data element, update management information may be included in the journal. The update management information may include an ID (a LUN, for example) of the primary data volume 411P serving as the write destination (update destination) of the data element, an update position (a logical block address, for example) in the primary data volume 411P, an update time, an update order, and so on, for example. Of the information in the journal, the data element is stored in the primary journal volume 412P1, whereas the update management information may be stored in another storage area such as the memory 215 instead of the primary journal volume 412P1.

The copying program 233 transfers a non-transferred journal, from among the plurality of journals accumulated in the primary journal volume 412P1, to the secondary storage system 101S having the secondary journal volume 412S1 that forms a journal pair with the primary journal volume 412P1. This transfer may be performed in response to a journal transfer request received from the secondary storage system 101S (in other words, the journal may be read from the primary journal volume 412P1 by the secondary storage system 101S), or may be performed actively without receiving a journal transfer request (in other words, the journal is written to the secondary journal volume 412S1 by the primary storage system 101P), for example. The transfer does not have to be performed in synchronization with data element writing performed upon reception of a write request from the host computer 104.

The controller 111 of the secondary storage system 101S receives the journal. The copy program 233 writes the received journal in the secondary journal volume 412S1. On the basis of the update management information in the journal (which has not been subjected to restoration processing) stored in the secondary journal volume 412S1, the restoration program 234 writes the data element in the journal to the secondary data volume 411S.

Information regarding the primary data volumes and secondary data volumes that form copy pairs, the primary journal volumes and secondary journal volumes that form journal pairs, the logical volumes that exist in each storage system, and so on is recorded in the various aforementioned tables. Each of these tables will now be described. In the description of the tables provided in the storage system 101, the storage system 101 will occasionally be referred to as the "home storage system 101".

FIG. 5 shows an example of the configuration of the storage volume table 241.

Information relating to each of the logical volumes provided in the home storage system 101 is recorded in the storage volume table 241. For example, a VOL#511, a VDEV#512, a RAID group#513, and a capacity 514 are recorded in relation to a single logical volume (to be referred to hereafter as the "subject volume" in the description of FIG. 5).

The VOL#511 is a number for identifying the subject volume in the home storage system 101.

The VDEV#512 is a number for identifying a virtual device allocated with a storage area of the subject volume. Note that the subject volume does not have to be allocated to a virtual device, and in this case, an invalid value may be recorded as the VDEV#512 in relation to the subject volume.

The RAID group#513 is a number for identifying the RAID group to which the subject volume belongs.

The capacity 514 is information indicating the storage capacity of the subject volume.

FIG. 6 shows an example of the configuration of the storage table 242.

Information relating to the home storage system and another storage system having the home storage system as a target or source during remote copying is recorded in the storage table 242. More specifically, a storage ID 611, which is an ID for identifying the storage system 101, and an IP address 612, which is information indicating the IP address of the storage system 101, are recorded respectively for the home storage system and the other storage system. Note that another type of information (for example, a WWN (World Wide Name)) used for communication may be employed in place of the IP address.

Figure 7:
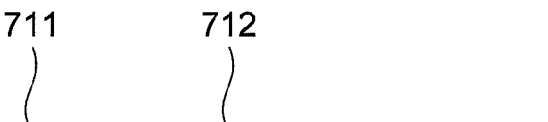
FIG. 7 shows an example of the configuration of a journal table.

FIG. 7 shows an example of the configuration of the journal table 243.

Information relating to each of the journal volumes in the home storage system 101 is recorded in the journal table 243. For example, a journal ID 711 and an affiliated VOL#712 are recorded for a single journal volume (to be referred to hereafter as the "subject journal volume" in the description of this drawing).

The journal ID 711 is an ID for identifying the subject journal volume.

The affiliated VOL#712 is one or more numbers respectively identifying the one or more logical volumes constituting the subject journal volume.

Figure 8:
FIG. 8 shows an example of the configuration of a pair table.

FIG. 8 shows an example of the configuration of the pair table 244.

Information relating to each copy pair is recorded in the pair table 244. For example, a pair ID 811, a pair status 812, a storage ID 813, a VOL#814, a storage ID 815, a VOL#816, and a journal ID 817 are recorded for a single copy pair (to be referred to hereafter as the "subject copy pair" in the description of FIG. 8).

The pair ID 811 is an ID for identifying the copy pair.

The pair status 812 is information indicating the state of the copy pair. The state of the copy pair may be one of two types, namely "normal" and "abnormal", for example. When the pair status is "normal", remote copying is in a normal state. A normal state is a state in which the storage systems 101P, 101S are both capable of executing the processing described with reference to FIG. 4. When the pair status is "abnormal", remote copying is in an abnormal state. An abnormal state is a state in which the storage systems 101P, 101S are respectively incapable of executing the processing described with reference to FIG. 4. An abnormal state is caused by a fault in the storage system 101, a fault in the storage network 105, and so on, for example.

The storage ID 813 is a storage ID for identifying the storage system comprising the primary data volume of the subject copy pair. This ID 813 corresponds to the storage ID 611 of the storage table 242.

The VOL#814 is a number (VOL#) for identifying the primary data volume of the subject copy pair.

The storage ID 815 is a storage ID for identifying the storage system comprising the secondary data volume of the subject copy pair. This ID 815 corresponds to the storage ID 611 of the storage table 242.

The VOL#816 is a number (VOL#) for identifying the secondary data volume of the subject copy pair.

The journal ID 817 is an ID of the journal volume in the home storage system that corresponds to the primary data volume or secondary data volume of the subject copy pair.

The storage ID 813, VOL#814, storage ID 815, VOL#816, and journal ID 817 are values specified when the manager instructs the storage system 101 to perform remote copying processing. The storage system 101 executes remote copying processing on the basis of these values. Note that the pair ID 811 may be specified instead of these values.

Figure 9:
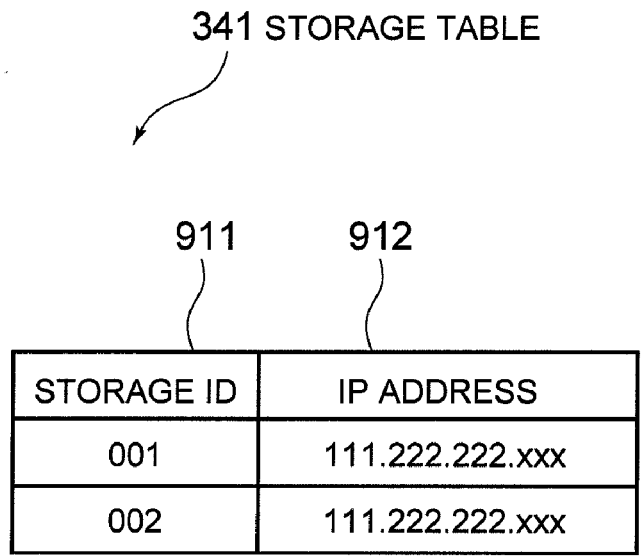
FIG. 9 shows an example of the configuration of a storage table.

FIG. 9 shows an example of the configuration of the storage table 341.

Information relating to the storage system 101 managed by the storage management server 102 is recorded in the storage table 341. For example, a storage ID 911, which is an ID for identifying the storage system 101, and an IP address 912, which is information indicating an IP address for accessing the storage system 101, are recorded for a single storage system 101. Note that another type of information (for example, a WWN (World Wide Name)) may be employed in place of the IP address.

Figure 10:
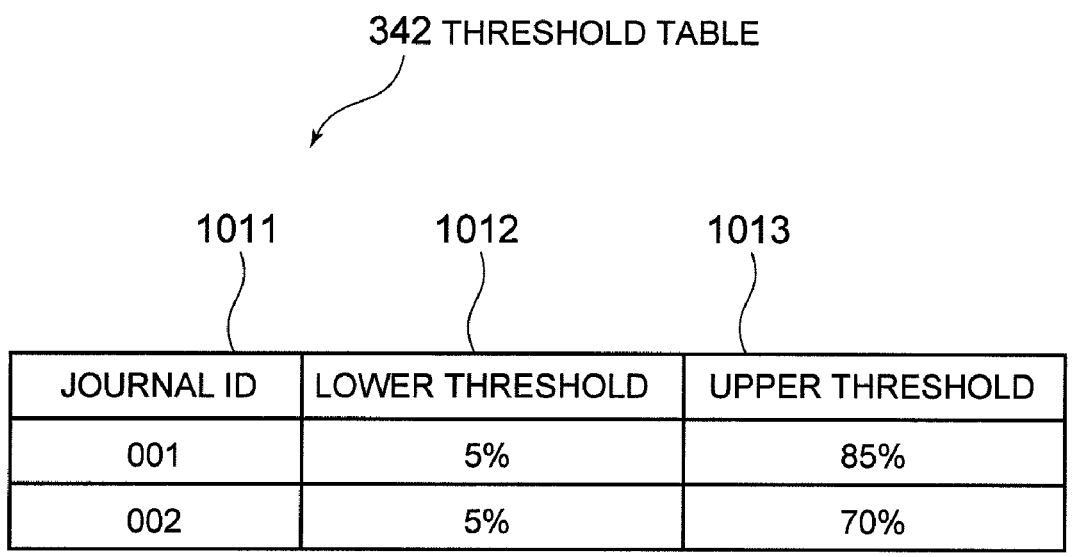
FIG. 10 shows an example of the configuration of a threshold table.

FIG. 10 shows an example of the configuration of the threshold table 342.

Thresholds enabling the storage management server to determine whether or not to perform disk suspension and disk activation are recorded in the threshold table 342. For example, a journal ID 1011, a lower threshold 1012, and an upper threshold 1013 are recorded for a single secondary journal volume (to be referred to hereafter as the "subject secondary journal volume" in the description of FIG. 10).

The journal ID 1011 is an ID for identifying the subject secondary journal volume.

The lower threshold 1012 is a threshold that is compared with the journal store rate of the subject secondary journal volume when determining whether or not to perform disk suspension. The lower threshold 1012 is not essential. If the lower threshold 1012 is not provided and the journal store rate of the subject secondary journal volume is detected to be zero, a disk suspension command relating to the secondary data volume corresponding to the subject secondary journal volume (in other words, the data volume serving as the write destination of a data element within a journal stored in the subject secondary journal volume) is transmitted.

The upper threshold 1013 is a threshold that is compared with the journal store rate of the subject secondary journal volume when determining whether or not to perform disk activation.

The lower threshold 1012 and/or the upper threshold 1013 are defined by the manager for each secondary journal volume, but may take preset fixed values.

The lower threshold 1012 and upper threshold 1013 are prepared for each secondary journal volume. Accordingly, the lower threshold 1012 and upper threshold 1013 of a secondary journal volume may be adjusted on the basis of the storage capacity of the secondary journal volume, for example.

FIG. 11 shows an example of the configuration of the copy pair table 343.

Information relating to each copy pair is recorded in the copy pair table 343. For example, a pair ID 1111, a pair status 1112, a storage ID 1113, a VOL#1114, a journal ID 1115, a storage ID 1116, a VOL#1117, and a journal ID 1118 are recorded for a single copy pair (to be referred to hereafter as the "subject copy pair" in the description of FIG. 11). Of these information elements, the pair ID 1111, pair status 1112, storage ID 1113, VOL#1114, storage ID 1116, and VOL#1117 correspond respectively to the pair ID 811, pair status 812, storage ID 813, VOL#814, storage ID 815, and VOL#816 of FIG. 8.

The journal ID 1115 is an ID of the primary journal volume corresponding to the primary data volume of the subject copy pair. Meanwhile, the journal ID 1118 is an ID of the secondary journal volume corresponding to the secondary data volume of the subject copy pair.

FIG. 12 shows an example of the configuration of the copy journal table 344.

Information relating to the primary journal volume and secondary journal volume and information relating to whether the secondary data volume corresponding to the secondary journal volume is in a state of disk suspension or disk activation are recorded in the copy journal table 344. For example, a journal pair ID 1211, an S-VOL state 1212, a storage ID 1213, a journal ID 1214, a storage ID 1215, and a journal ID 1216 are recorded for a single journal pair (to be referred to hereafter as the "subject journal pair" in the description of FIG. 12).

The journal pair ID 1211 is an ID identifying the subject journal pair.

The S-VOL state 1212 is information indicating whether the secondary data volume (S-VOL) corresponding to the secondary journal volume of the subject journal pair is in a state of disk suspension or disk activation. When the secondary data volume is in a state of disk suspension, all of the one or more storage devices 112 relating to the secondary data volume (the storage devices 112 providing all or a part of the storage space of the secondary data volume) are in a state of disk suspension (for example, the power thereof is OFF). On the other hand, when the secondary data volume is in a state of disk activation, all of the one or more storage devices 112 relating to the secondary data volume are in a state of disk activation (for example, the power thereof is ON).

The storage ID 1213 is the storage ID of the primary storage system comprising the primary journal volume of the subject journal pair.

The journal ID 1214 is the journal ID of the primary journal volume of the subject journal pair.

The storage ID 1215 is the storage ID of the secondary storage system comprising the secondary journal volume of the subject journal pair.

The journal ID 1216 is the journal ID of the secondary journal volume of the subject journal pair.

Processing performed in this embodiment in relation to power saving control will now be described.

Figure 13:
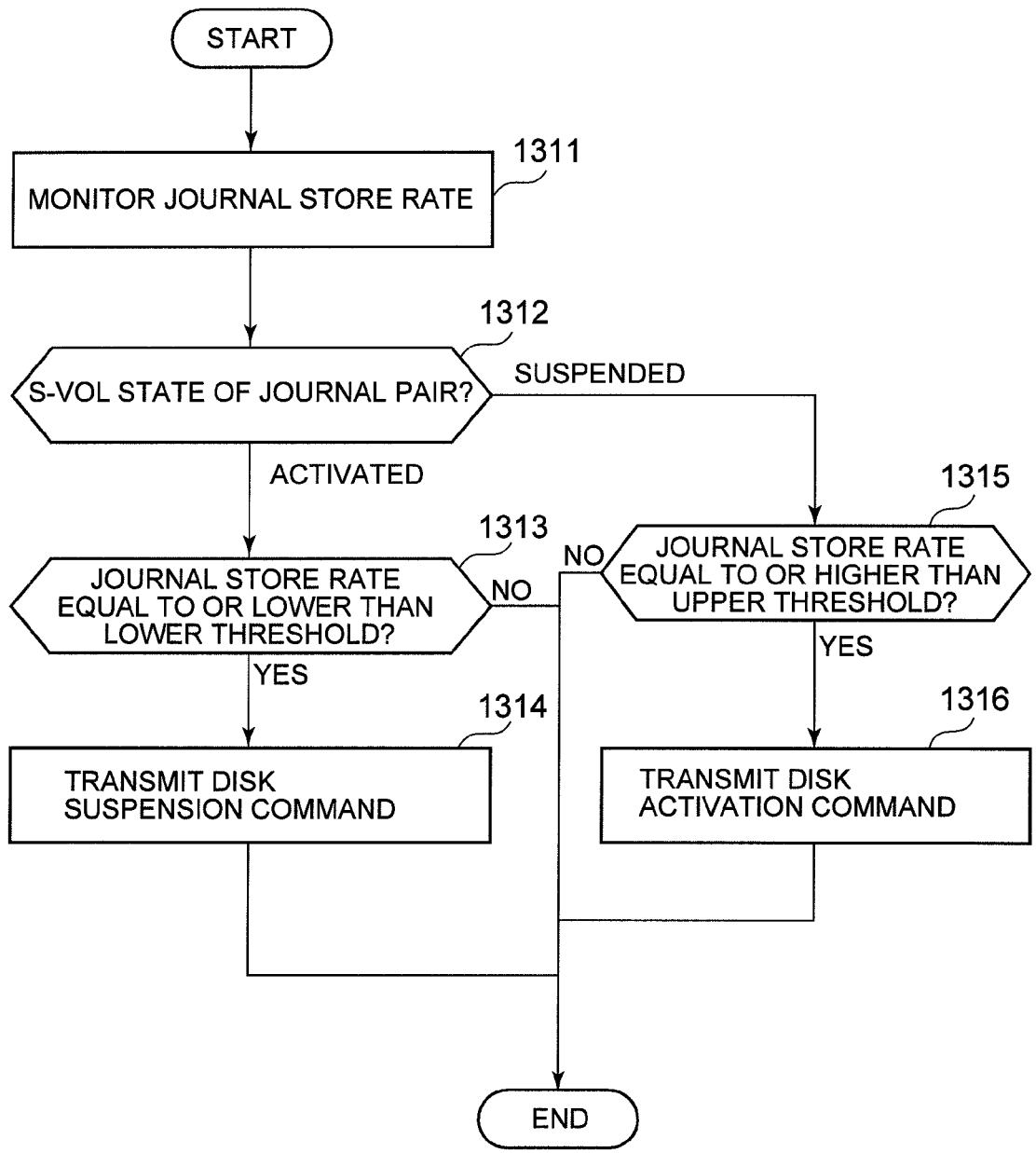
FIG. 13 shows an example of the flow of processing executed by a power control program of a storage management server.

FIG. 13 shows an example of the flow of a power save control operation, which is executed by the storage management server 102.

This processing is begun by having a scheduler function instruct the power control program 332 to execute the processing at fixed time intervals or the like, for example.

In a step 1311, the journal monitoring program 331 obtains an accumulated journal amount of the secondary journal volume with respect to a journal pair (to be referred to hereafter as "the journal pair" in the description of FIG. 13) specified from the copy journal table 344, and calculates the journal store rate using the storage capacity (which is identified from the storage volume table 241 and journal table 243) of the secondary journal volume. Here, the "journal store rate" is the proportion of the total number of the one or more journals that have not been subjected to restoration processing (i.e. the one or more journals that have not been reflected in a secondary data volume), from among the plurality of journals that are actually stored, relative to the storage capacity of the secondary journal volume. The accumulated journal amount used to calculate the journal store rate may be managed and obtained using various methods. For example, by deleting a journal that has undergone restoration processing from the secondary journal volume every time restoration processing is completed, the used storage capacity of the secondary journal volume (for example, the used storage capacity indicated by file system information of the secondary journal volume) may be used as the accumulated journal amount. Alternatively, if the one or more journals in the secondary journal volume that have not been subjected to restoration processing are consecutive, for example, the accumulated journal amount may be obtained on the basis of an access destination address (pointer) of the following restoration processing and the address range of the secondary journal volume.

In a step 1312, the journal monitoring program 331 obtains the S-VOL state 1212 of the journal pair from the copy journal table 344, and determines whether the S-VOL state 1212 is "activated" or "suspended". When the S-VOL state 1212 is "activated", the routine advances to a step 1313, and when the S-VOL state 1212 is "suspended", the routine advances to a step 1315. Note that two or more journal pairs may exist, and in this case, each of the steps described with reference to FIG. 13 is executed for each of the two or more journal pairs.

In the step 1313, the journal monitoring program 331 uses the journal ID 1216 of the secondary journal volume of the journal pair to obtain the lower threshold 1012 corresponding to the secondary journal volume from the threshold table 342, compares the obtained lower threshold 1012 with the journal store rate obtained in the step 1311, and determines whether or not the journal store rate is equal to or lower than the lower threshold 1012. If the journal store rate is equal to or lower than the lower threshold 1012, the routine advances to a step 1314, and if not, the routine ends.

In the step 1314, the power control program 331 transmits a disk suspension command to the secondary storage system (for example, the storage system identified by the storage ID 1215 corresponding to the journal ID 1216 used in the step 1313) in response to access from the journal monitoring program 331, for example. When transmitting the disk suspension command, the IP address 912 (the IP address 912 obtained from the storage table 341) corresponding to the storage ID 1215, for example, is used. The journal ID 1216 of the secondary journal volume is recorded in the disk suspension command, but the one or more VOL#1117 corresponding to the journal ID 1216 (i.e. the identification numbers of all of the secondary data volumes corresponding to the secondary journal volume) may be recorded instead of, or in addition to, the journal ID 1216.

In the step 1315, the journal monitoring program 331 uses the journal ID 1216 of the secondary journal volume of the journal pair to obtain the upper threshold 1013 corresponding to the secondary journal volume from the threshold table 342, compares the obtained upper threshold 1013 with the journal store rate obtained in the step 1311, and determines whether or not the journal store rate is equal to or higher than the upper threshold 1013. If the journal store rate is equal to or higher than the upper threshold 1013, the routine advances to a step 1316, and if not, the routine ends.

In the step 1316, the power control program 331 transmits a disk activation command to the secondary storage system (for example, the storage system identified by the storage ID 1215 corresponding to the journal ID 1216 used in the step 1315). The journal ID 1216 of the secondary journal volume is also recorded in the disk activation command, similarly to the disk suspension command, but the one or more VOL#1117 corresponding to the journal ID 1216 (i.e. the identification numbers of all of the secondary data volumes corresponding to the secondary journal volume) may be recorded instead of, or in addition to, the journal ID 1216.

Figure 14:
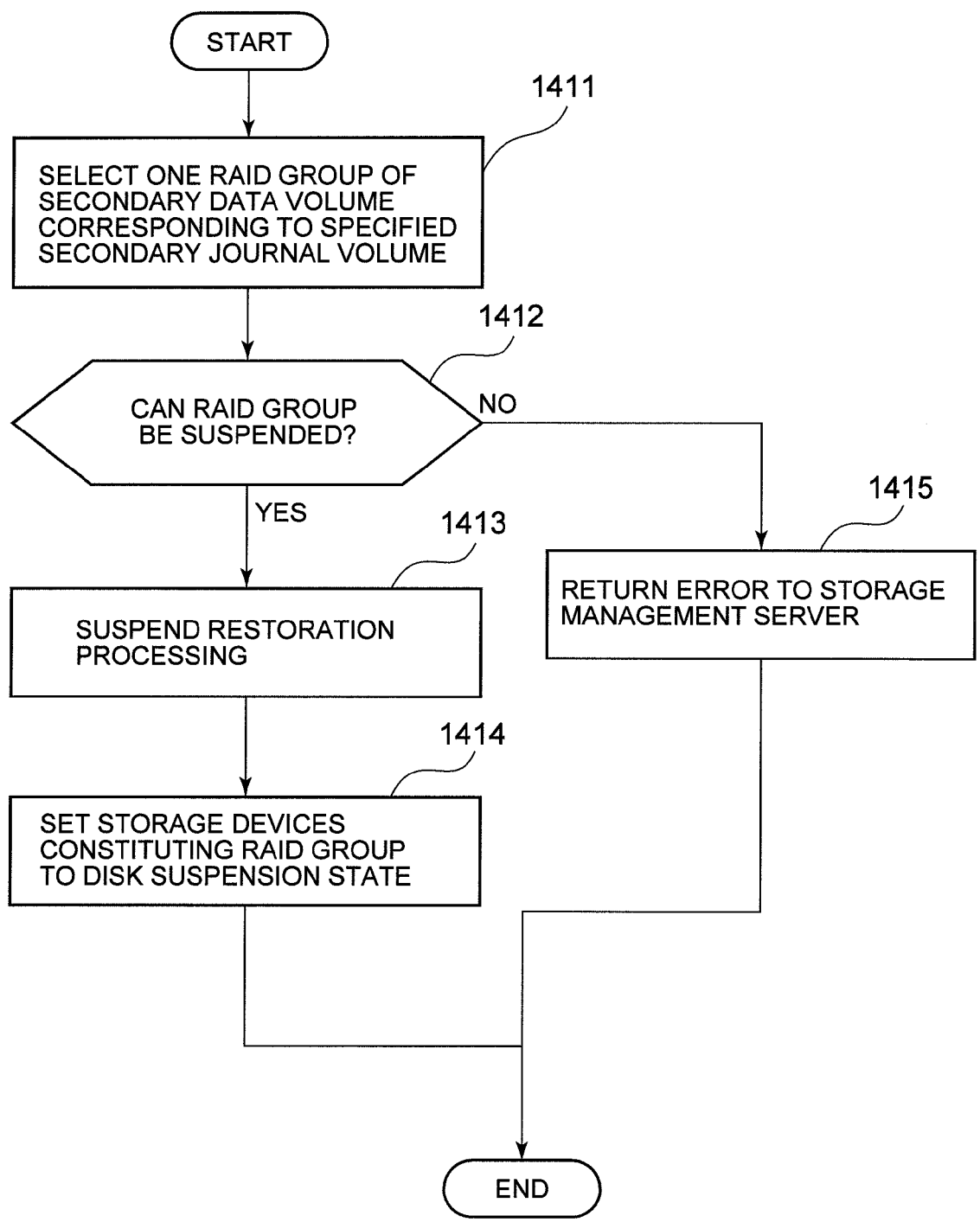
FIG. 14 shows an example of the flow of processing performed by a secondary storage system upon reception of a disk suspension command.

FIG. 14 shows an example of the flow of processing performed by the secondary storage system 101S upon reception of the disk suspension command.

In a step 1411, the HDD power control program 235 identifies the RAID group to which the secondary data volume specified from the received disk suspension command (for example, the secondary data volume corresponding to the secondary journal volume specified by the disk suspension command) belongs on the basis of the pair table 244 and storage volume table 241. Note that in the step 1411, a plurality of RAID groups may be identified, and in this case, the step 1411 is performed for each of the specified secondary data volumes.

In a step 1412, the HDD power control program 235 determines whether or not the RAID group identified in the step 1411 can be suspended. RAID group suspension means setting all of the two or more storage devices 112 constituting the RAID group in a state of disk suspension. Examples of cases in which the identified RAID group cannot be suspended include a case in which a secondary data volume corresponding to a different secondary journal volume to the secondary journal volume specified from the disk suspension command corresponds to the identified RAID group, and a case in which the logical volumes constituting the different secondary journal volume correspond to the identified RAID group. When it is determined in the step 1412 that the identified RAID group can be suspended, the routine advances to a step 1413, and when it is determined that the identified RAID group cannot be suspended, the routine advances to a step 1415. When a plurality of RAID groups are identified in the step 1411 and a determination is made as to whether or not at least one of the plurality of RAID groups can be suspended, the step 1415 need not be performed.

In the step 1413, the restoration program 234 suspends restoration processing in relation to the secondary data volume specified from the received disk suspension command.

In a step 1414, following restoration processing suspension, the HDD power control program 235 sets all of the storage devices 112 constituting the RAID group identified in the step 1411 in a state of disk suspension. More specifically, for example, the HDD power control program 235 transmits a disk suspension command to each of the storage devices 112. Having received the disk suspension command, the storage devices 112 shift to a state of disk suspension (a power OFF state, for example) in response to the disk suspension command.

In the step 1415, the HDD power control program 235 notifies the storage management server 102 of an error.

Figure 15:
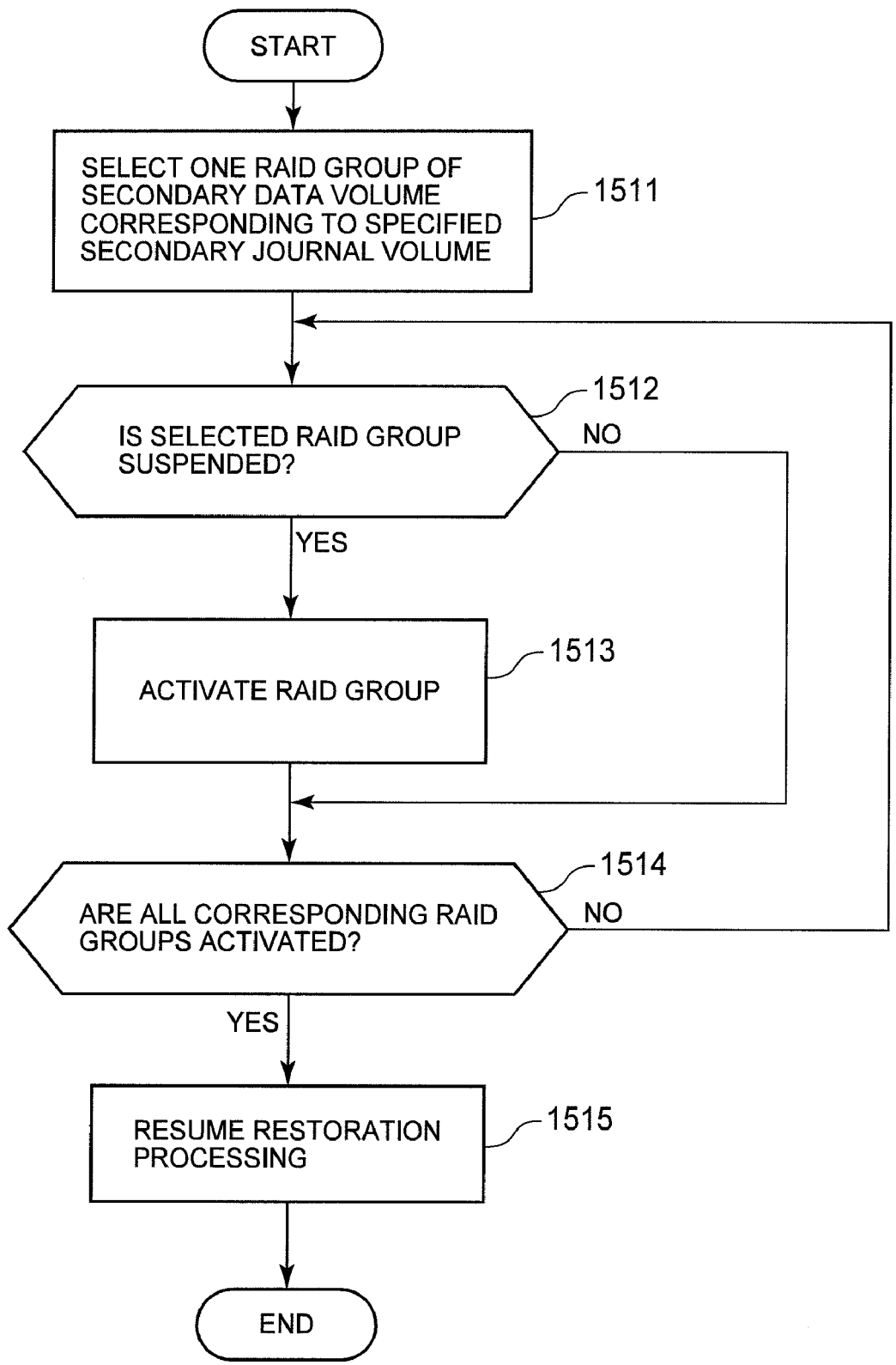
FIG. 15 shows an example of the flow of processing performed by the secondary storage system upon reception of a disk activation command.

FIG. 15 shows an example of the flow of processing performed by the secondary storage system 101S upon reception of a disk activation command.

In a step 1511, the HDD power control program 235 selects one RAID group to which the secondary data volume specified from the received disk activation command belongs on the basis of the pair table 244 and storage volume table 241.

In a step 1512, the HDD power control program 235 determines whether or not the RAID group selected in the step 1511 has been suspended. If it is determined that the selected RAID group has been suspended, the routine advances to a step 1513, and if not, the routine advances to a step 1514.

In the step 1513, the HDD power control program 235 sets all of the storage devices 112 constituting the selected RAID group to a state of disk activation. More specifically, for example, the HDD power control program 235 transmits a disk activation command to each of the storage devices 112. Having received the disk activation command, the storage devices 112 shift to a state of disk activation (a power ON state, for example) in response to the disk activation command. At this time, the part (a circuit, for example) of the storage device 112 that receives the disk activation command remains in a power ON state, even when the storage device 112 is in a power OFF state, for example.

In the step 1514, the HDD power control program 235 determines whether or not all of the RAID groups corresponding to the secondary journal volume specified by the disk activation command received from the storage management server 102 are activated (whether or not the storage devices 112 relating to all of the RAID groups are in a state of disk activation). When at least one RAID group is not activated, one of the other RAID groups to which the secondary data volume specified from the received disk activation command belongs is selected, whereupon the routine returns to the step 1512. On the other hand, when all of the RAID groups are activated, the routine advances to a step 1515.

In the step 1515, the restoration program 234 resumes restoration processing (in other words, cancels the restoration processing suspension) on the secondary journal volume specified by the received disk activation command in response to access from the HDD power control program 235, for example.

In the first embodiment described above, the storage devices 112 relating to the secondary journal volume 412S1 are set in a state of disk activation at all times. The storage management server 102 transmits a disk suspension command to the secondary storage system 101S in accordance with the journal store rate of the secondary journal volume 412S1. In response to reception of the disk suspension command, the secondary storage system 101S suspends restoration processing and then sets all of the storage devices 112 relating to all of the secondary data volumes 411S corresponding to the secondary journal volume 412S1 in a state of disk suspension. As a result, the power consumption of the secondary storage system 101S can be reduced without suspending journal transfer from the primary storage system 101P to the secondary storage system 101S.

Furthermore, according to the first embodiment, while restoration processing is suspended, the total number of journals in the secondary journal volume 412S1 that have not undergone restoration processing increases, but when the journal store rate of the monitoring subject secondary journal volume 412S1 reaches or exceeds the predetermined upper threshold 1013, the storage management server 102 transmits a disk activation command to the secondary storage system 101S. In response to the disk activation command, the secondary storage system 101S sets all of the storage devices 112 relating to all of the secondary data volumes 411S corresponding to the secondary journal volume 412S1 in a state of disk activation and then resumes restoration processing. As a result, a situation in which journals that have not undergone restoration processing overflow from the secondary journal volume 412S1 can be prevented while realizing the power saving described above.

First Modified Example of First Embodiment

A first modified example of the first embodiment will be described below. Description will focus on differences with the first embodiment, and description of commonalities with the first embodiment will be omitted or simplified.

In this modified example, the storage management server 102 monitors the journal increasing pace of the secondary journal volume 412S1 in addition to the journal store rate of the secondary journal volume 412S1, and controls disk suspension and disk activation on the basis of both the journal store rate and the journal increasing pace.

Figure 16:
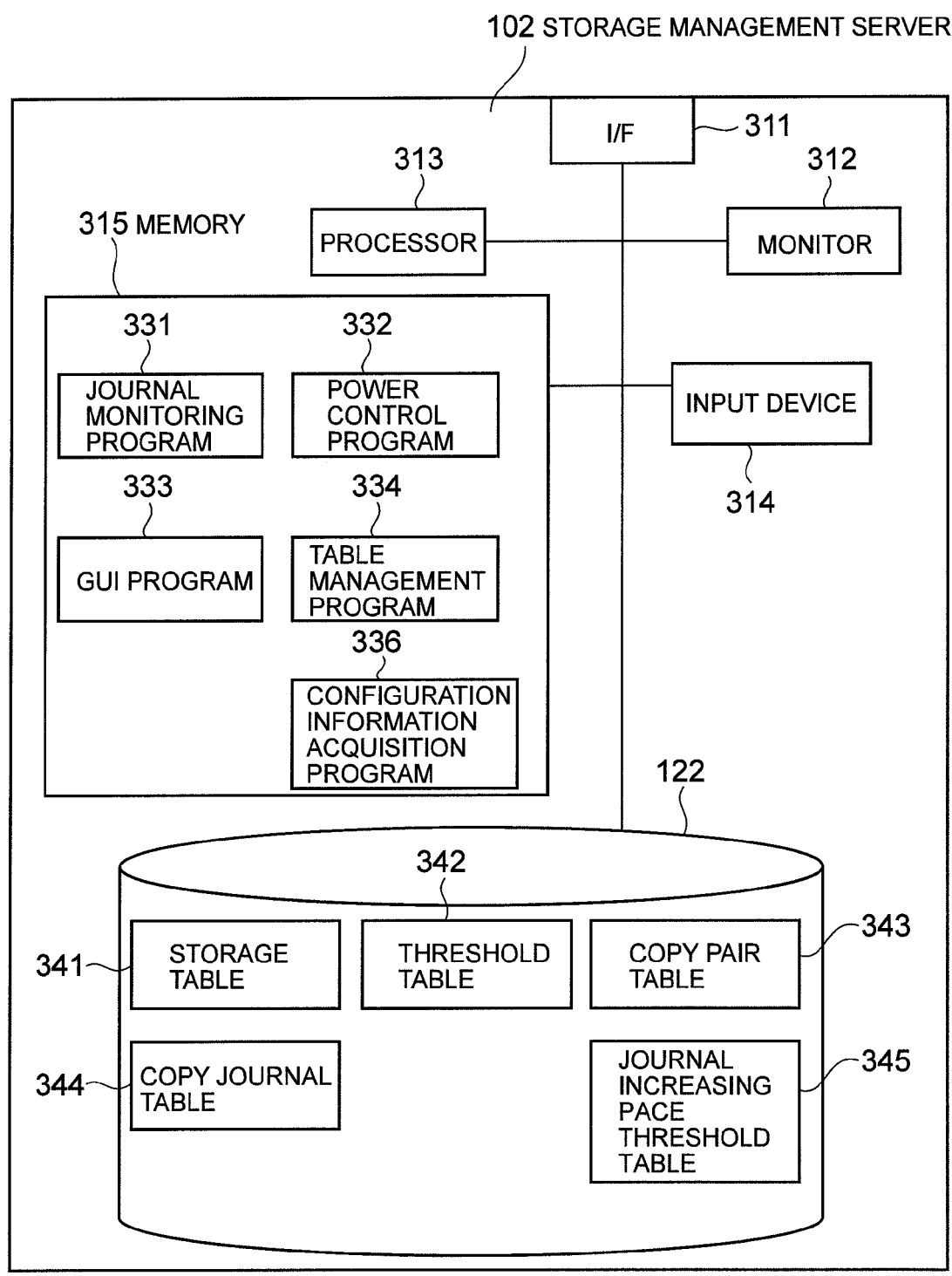
FIG. 16 shows an example of the configuration of a storage management server according to a first modified example of the first embodiment.

FIG. 16 shows an example of the configuration of the storage management server 102 according to the first modified example of the first embodiment.

FIG. 16 differs from FIG. 3 in the addition of a journal increasing pace threshold table 345. The journal increasing pace threshold table 345 is recorded with thresholds that are compared with the journal increasing pace monitored by the journal monitoring program 331.

Figures 17, 18:
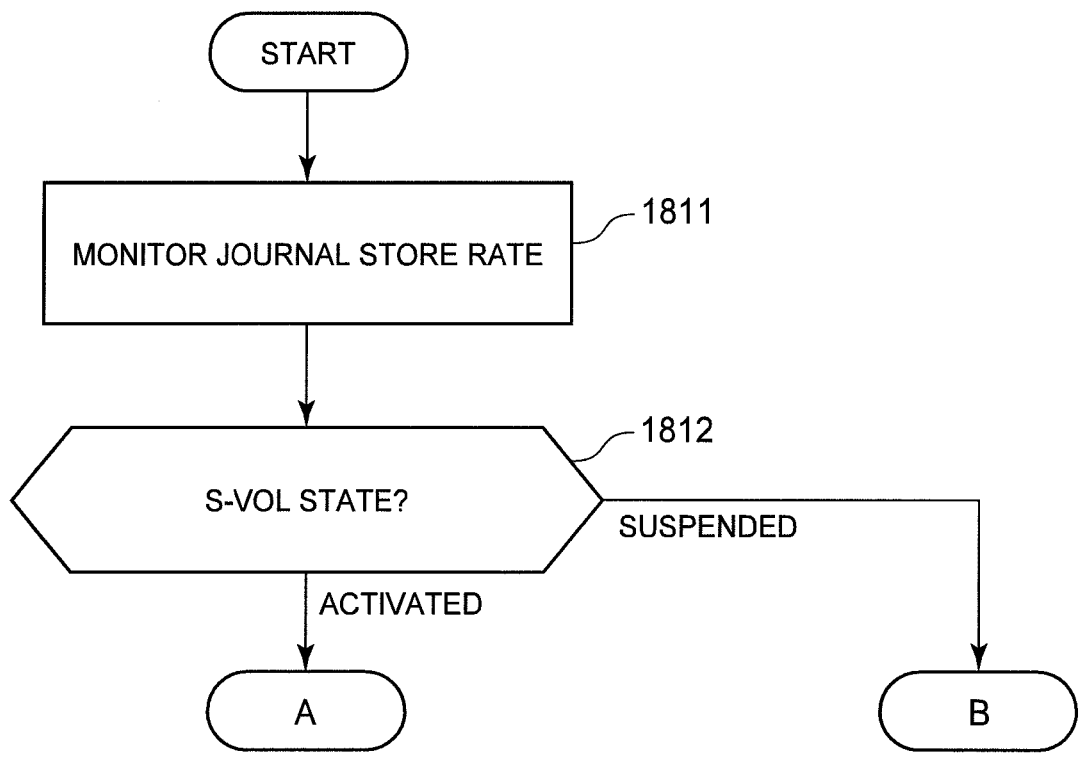
FIG. 17 shows an example of the configuration of a journal increasing pace threshold table.
FIG. 18 shows a first part of an example of the flow of processing performed by the storage management server in the first modified example of the first embodiment.

FIG. 17 shows an example of the configuration of the journal increasing pace threshold table 345.

A journal pair ID 1711, an increase speed lower threshold 1712, and an increase speed upper threshold 1713 are recorded in the journal increasing pace threshold table 345 for a single journal pair (to be referred to hereafter as the "subject journal pair" in the description of FIG. 17).

The journal pair ID 1711 is an ID for identifying the subject journal pair.

The increase speed lower threshold 1712 is a threshold that is compared to the journal increasing pace at the time of disk suspension. The increase speed lower threshold 1712 may be omitted. If the increase speed lower threshold 1712 is omitted, the absence of journal writing to the secondary journal volume 412S1 for a fixed time period may be employed as a condition for disk suspension, for example.

The increase speed upper threshold 1713 is a threshold that is compared to the journal increasing pace at the time of disk activation.

The increase speed lower threshold 1712 and increase speed upper threshold 1713 may be defined by the manager for each journal pair, or instead of definition by the manager, the increase speed lower threshold 1712 and increase speed upper threshold 1713 may take preset values.

Figure 19:
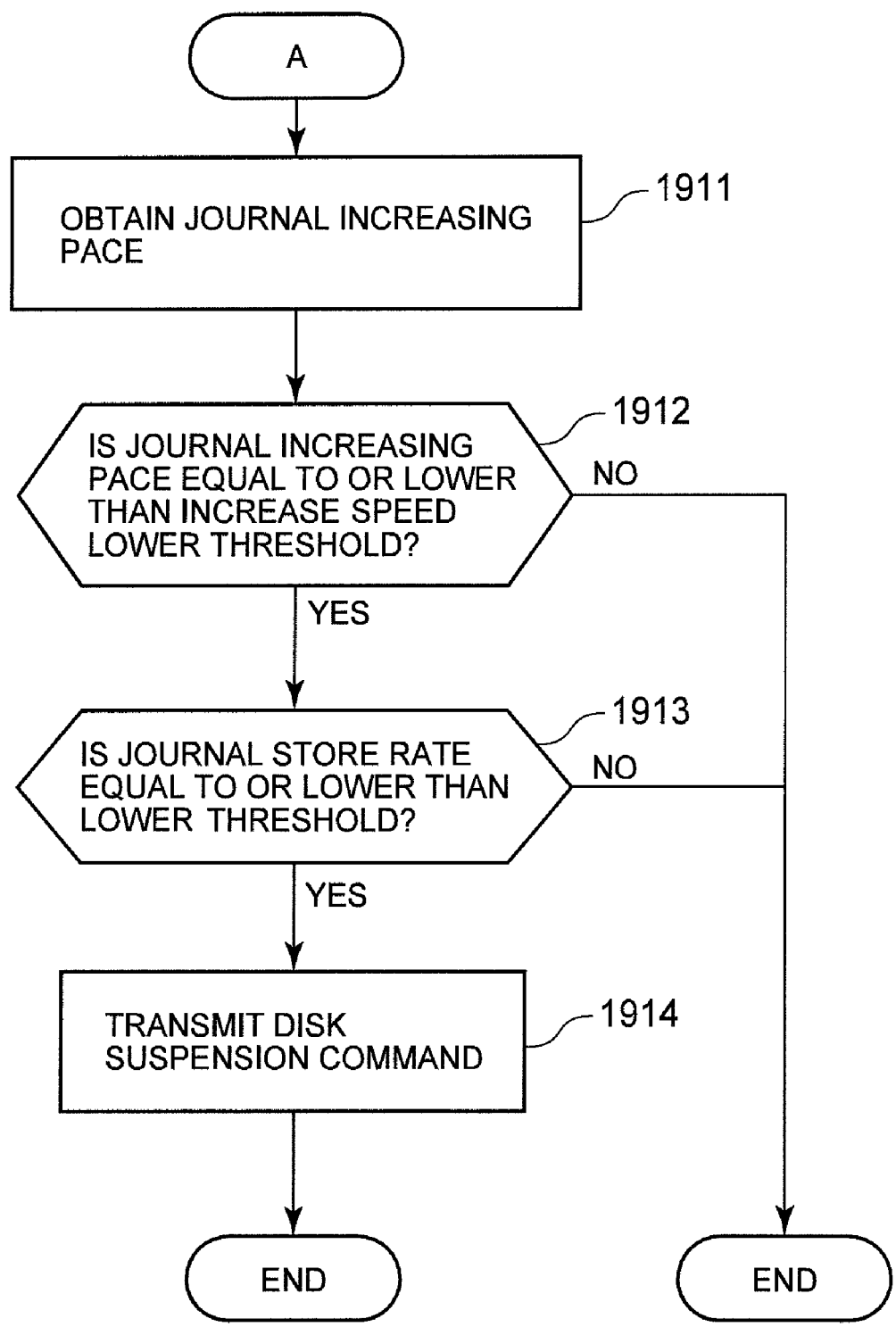
FIG. 19 shows a second part of an example of the flow of processing performed by the storage management server in the first modified example of the first embodiment.
Figure 20:
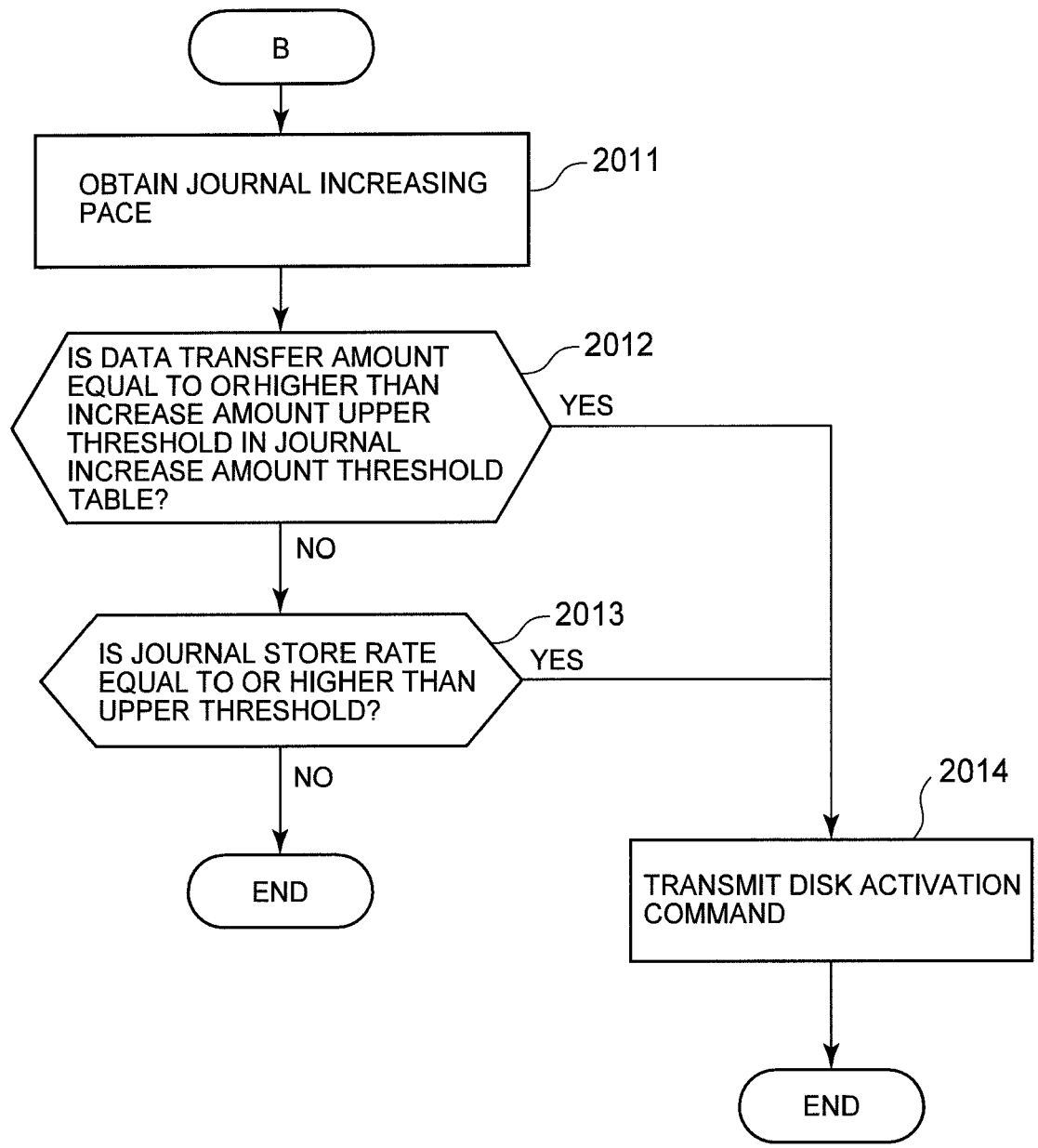
FIG. 20 shows a third part of an example of the flow of processing performed by the storage management server in the first modified example of the first embodiment.

FIG. 18 through 20 show an example of the flow of processing performed by the storage management server 102.

In a step 1811 in FIG. 18, the journal monitoring program 331 obtains the accumulated journal amount of the secondary journal volume in relation to each journal pair, and uses the accumulated journal amount to obtain (calculate) the journal store rate.

In a step 1812, the journal monitoring program 331 obtains the S-VOL state 1212 of each journal pair from the copy journal table 344, and determines the S-VOL state 1212. When the S-VOL state 1212 of a journal pair (to be referred to as the first journal pair hereafter) is "activated", the routine advances to a step 1911 in FIG. 19, and when the S-VOL state 1212 of a journal pair (to be referred to as the second journal pair hereafter) is "suspended", the routine advances to a step 2011 in FIG. 20.

In the step 1911 in FIG. 19, the journal monitoring program 331 obtains, from the primary storage system 101P, a journal transfer speed from the primary journal volume 412P1 to the secondary journal volume 412S1. The journal transfer speed is the aforementioned journal increasing pace. Note that instead of obtaining the journal transfer speed from the primary storage system 101P, a data update speed relating to the primary data volume 411P may be obtained from the primary storage system 101P, or a journal receive pace relating to the secondary journal volume 412S1 may be obtained from the secondary storage system 101S. Basically, any speed may be obtained as long as it relates to an increase per unit time in the number of journals (journals that have not undergone restoration processing) added to the secondary journal volume 412S1. Regardless of the speed that is obtained, in this embodiment the speed will be referred to as the "journal increasing pace" for convenience.

In a step 1912, the journal monitoring program 331 compares the obtained journal increasing pace (journal transfer speed) with the increase speed lower threshold 1712 (the increase speed lower threshold 1712 recorded in the journal increasing pace threshold table 345) corresponding to the first journal pair, and determines whether or not the journal increasing pace is equal to or lower than the increase speed lower threshold 1712. If the journal increasing pace is equal to or lower than the increase speed lower threshold 1712, the routine advances to a step 1913, and if not, the routine ends.

In the step 1913, the journal monitoring program 331 compares the journal store rate obtained in the step 1811 with the lower threshold 1012 (the lower threshold 1012 recorded in the threshold table 342) corresponding to the first journal pair, and determines whether or not the journal store rate is equal to or lower than the lower threshold 1012. If the journal store rate is equal to or lower than the lower threshold 1012, the routine advances to a step 1914, and if not, the routine ends.

In the step 1914, the power control program 331 transmits a disk suspension command specifying the secondary journal volume 412S1 of the first journal pair to the secondary storage system 101S in response to access from the journal monitoring program 331, for example.

In the step 2011 in FIG. 20, similarly to the step 1911 in FIG. 19, the journal monitoring program 331 obtains, from the primary storage system 101P, the journal transfer speed from the primary journal volume 412P1 to the secondary journal volume 412S1.

In a step 2012, the journal monitoring program 331 compares the obtained journal increasing pace (journal transfer speed) with the increase speed upper threshold 1713 (the increase speed upper threshold 1713 recorded in the journal increasing pace threshold table 345) corresponding to the second journal pair, and determines whether or not the journal increasing pace is equal to or higher than the increase speed upper threshold 1713. If the journal increasing pace is equal to or higher than the increase speed upper threshold 1713, the routine advances to a step 2014, and if not, the routine advances to a step 2013.

In the step 2013, the journal monitoring program 331 compares the journal store rate obtained in the step 1811 with the upper threshold 1013 (the upper threshold 1013 recorded in the threshold table 342) corresponding to the second journal pair, and determines whether or not the journal store rate is equal to or higher than the upper threshold 1013. If the journal store rate is equal to or higher than the upper threshold 1013, the routine advances to a step 2014, and if not, the routine ends.

In the step 2014, the power control program 331 transmits a disk activation command specifying the secondary journal volume 412S1 of the second journal pair to the secondary storage system 101S in response to access from the journal monitoring program 331, for example.

According to the first modified example of the first embodiment described above, in addition to the journal store rate, the journal transfer speed is used to determine whether or not to transmit the disk suspension command and whether or not to transmit the disk activation command. Particularly when determining whether or not to transmit the disk activation command, if the journal increasing pace is equal to or higher than the increase speed upper threshold 1713, a determination is made to transmit the disk activation command, regardless of whether or not the journal store rate is equal to or higher than the upper threshold 1013. As a result, a situation in which journals that have not undergone restoration processing overflow from the secondary journal volume 412S1 can be prevented reliably.

Second Modified Example of First Embodiment

Figure 21:
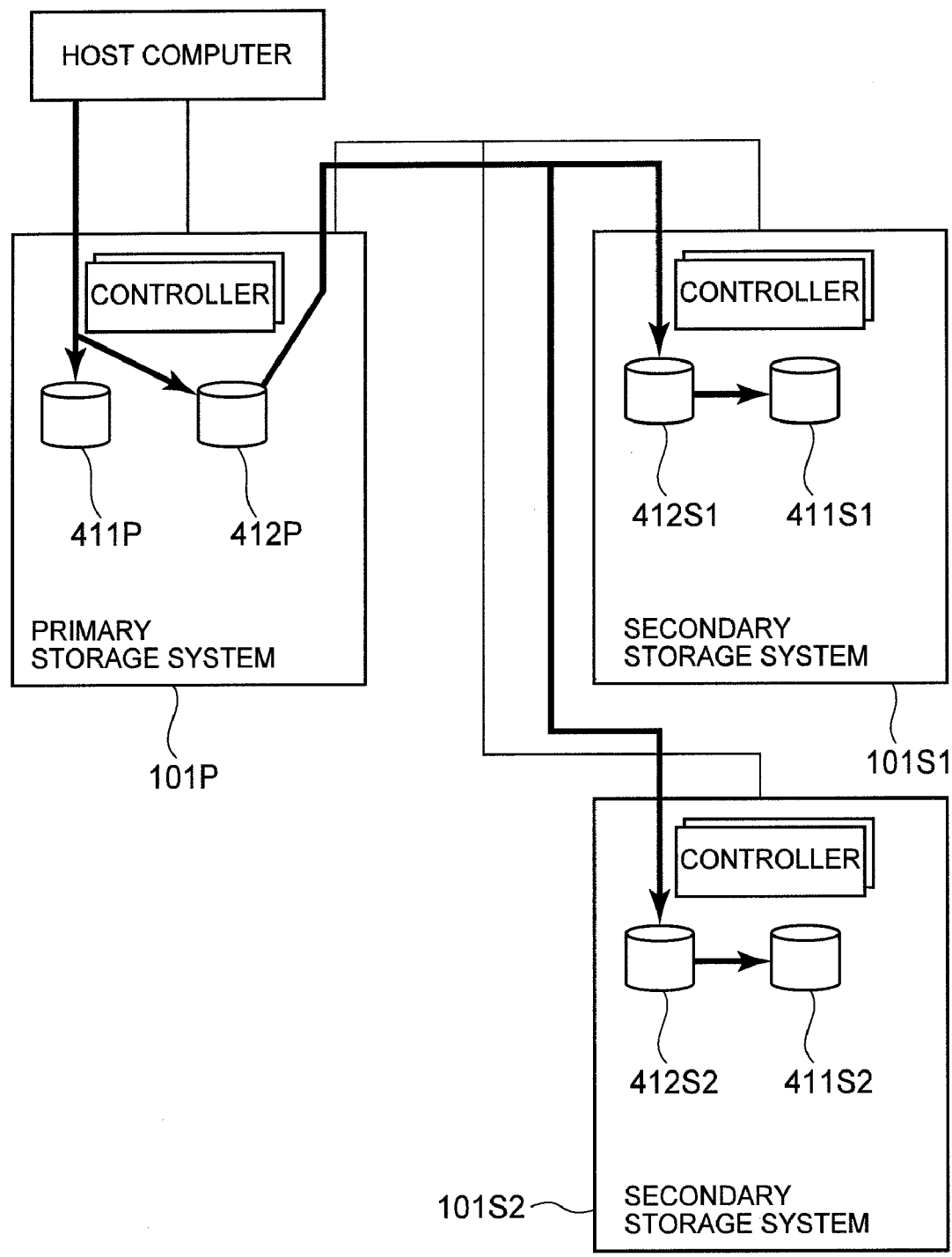
FIG. 21 is an illustrative view of remote copying according to a second modified example of the first embodiment.

FIG. 21 is an illustrative view of remote copying according to a second modified example of the first embodiment.

First and second secondary storage systems 101S1 and 101S2 are provided in relation to the single primary storage system 101P. A single primary data volume 411P serves as the primary data volume of a plurality of copy pairs. Accordingly, a first secondary data volume 411S1 and a second secondary data volume 411S2 are provided in relation to the single primary data volume 411P. Similarly, a single primary journal volume 412P1 serves as the primary journal volume of a plurality of journal pairs. Accordingly, a first secondary journal volume 412S1 and a second secondary journal volume 412S2 are provided in relation to the single primary journal volume 412P1.

In the second modified example of the first embodiment, a journal written into the primary journal volume 412P1 is written into both the first secondary journal volume 412S1 and the second secondary journal volume 412S2. Accordingly, the data elements in the journal are written into both the first secondary data volume 411S1 and the second secondary data volume 411S2.

With the configuration described above, monitoring and transmission of the disk suspension command and disk activation command are performed in relation to each journal pair in an identical manner to that described above. As a result, the power consumption of both the first and second secondary storage systems 101S1, 101S2 can be reduced.

Third Modified Example of First Embodiment

Figure 22:
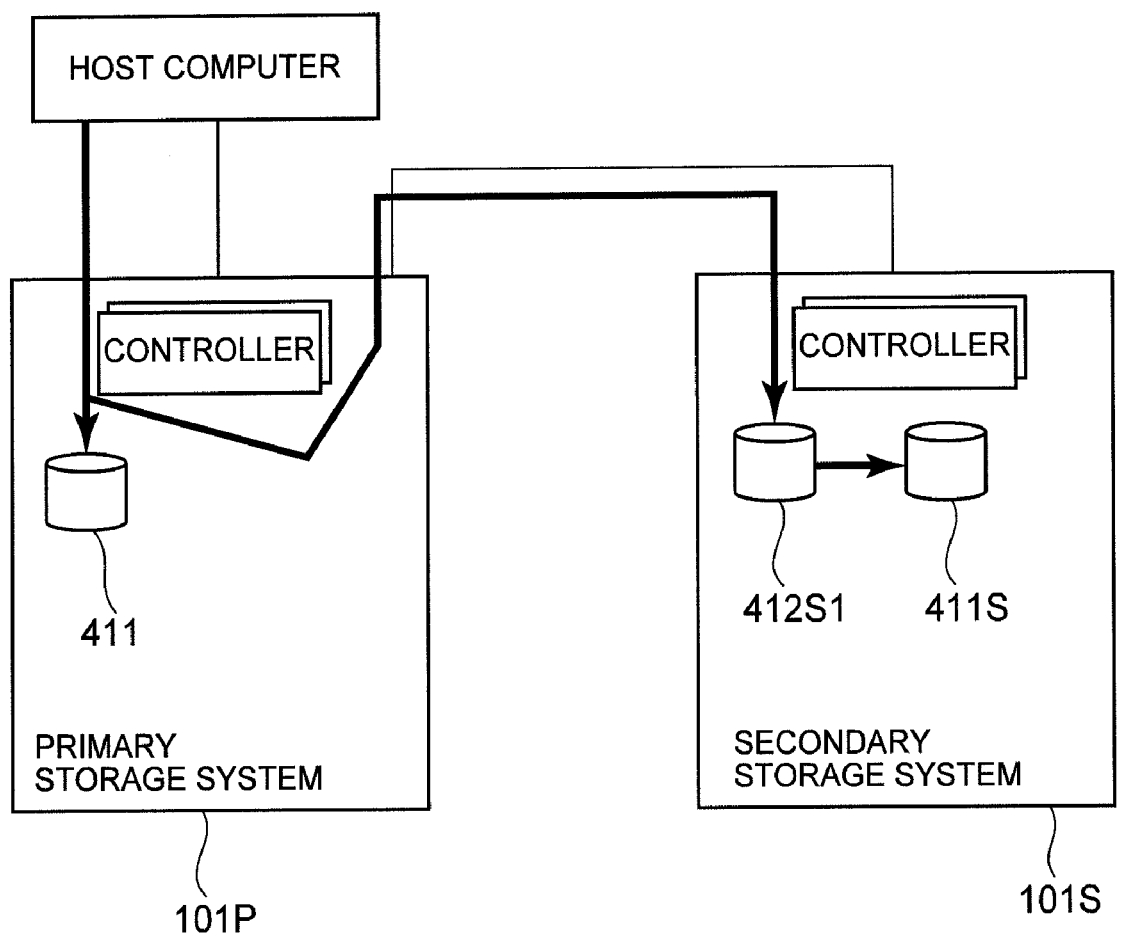
FIG. 22 is an illustrative view of remote copying according to a third modified example of the first embodiment.

FIG. 22 is an illustrative view of remote copying according to a third modified example of the first embodiment.

In the third modified example of the first embodiment, no primary journal volume exists in the primary storage system 101P. In this case, the I/O control program 231 of the primary storage system 101P stores a journal including the data elements written in the primary data volume 411P in the cache memory 216, and the copying program 233 transfers the journal in the cache memory 216 to the secondary storage system 101S. The transferred journal is stored in the secondary journal volume 412S1, and the data elements in the stored journal are written into the secondary data volume 411S.

Fourth Modified Example of First Embodiment

Figure 23:
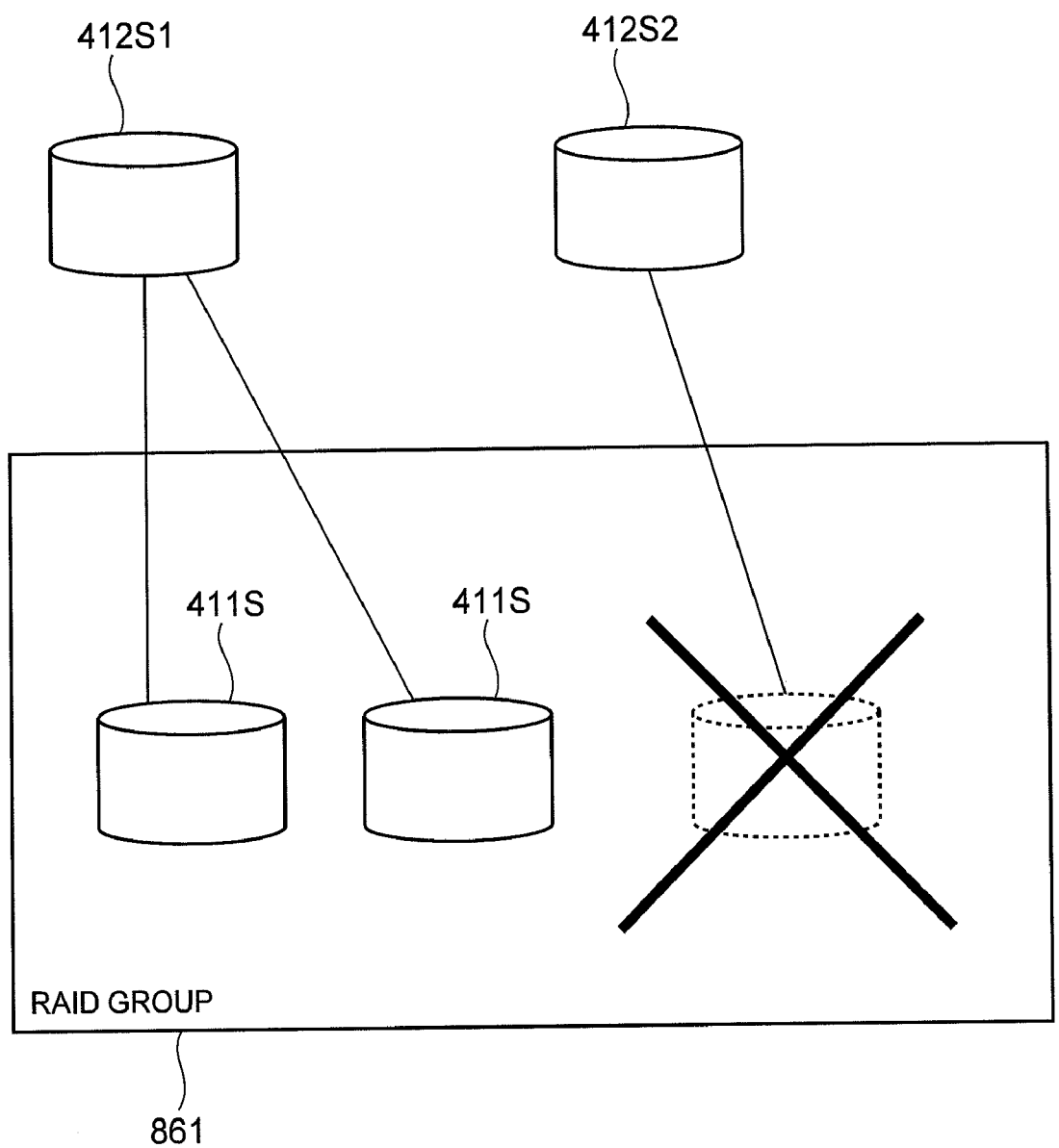
FIG. 23 shows types of logical volumes prepared in a single RAID group according to a fourth modified example of the first embodiment.

In a fourth modified example of the first embodiment, as shown in FIG. 23, a plurality of secondary data volumes 411S corresponding to the same secondary journal volume 412S1 are prepared in a single RAID group 861. In other words, control is performed such that the secondary data volumes 411S corresponding to the secondary journal volume 412S1 do not coexist with secondary data volumes corresponding to a different secondary journal volume 412S2 in a single RAID group 861. This control may be performed during logical volume creation, for example, or when such coexistence occurs for a certain reason, the coexistence may be avoided using a volume migration technique or the like. In so doing, a situation in which RAID group suspension is impossible due to the coexistence described above, for example, can be prevented.

Several embodiments and several modified examples of the present invention were described above, but these embodiments and modified examples are merely provided as examples for illustrating the present invention, and the scope of the present invention is not limited to these embodiments and modified examples alone. The present invention may be implemented in various other aspects that do not depart from the spirit thereof.

What is claimed is:

1. A system comprising:
at least two secondary storage systems for each receiving from a first storage system, a journal including one or more data element that is written in a primary logical volume provided in the first storage system; and
a management device for managing said secondary storage system,
each secondary storage system of said at least two secondary storage systems including:
a reception unit for receiving a command;
a journal storage area;
a plurality of storage devices;
a plurality of logical volumes, including a secondary logical volume, formed in a storage space of said plurality of storage devices;
a journal update unit for writing said journal received from said first storage system, into said journal storage area;
a restore control unit for executing restoration processing, in which said one or more data element in said journal stored in said journal storage area is written into said secondary logical volume; and
a storage device control unit for controlling said storage devices, and
said management device including:
a first acquisition unit for obtaining, for said each secondary storage system of said at least two secondary storage systems, a journal usage rate indicating an extent of usage of said journal storage area by said journal;
a second acquisition unit for obtaining, for said each secondary storage system of said at least two secondary storage systems, a journal addition rate relating to a total amount of journals added to said journal storage area per unit time; and
a command unit for transmitting to a target secondary storage system of said at least two secondary storage systems, a power saving command for reducing the power consumption of a storage device relating to said target secondary logical volume, in accordance with said journal usage rate and said journal addition rate of said target secondary storage system, satisfying predetermined conditions,
wherein said reception unit of said target secondary system receives said power saving command from said management device,
said restore control unit of said target secondary system suspends said restoration processing in response to reception of said power saving command,
said storage device control unit of said target secondary system executes power saving on said storage device relating to said secondary logical volume of said target secondary system, after said restoration processing is suspended; and,
said journal storage area of said target secondary system continues to operate in a non-power-saving mode, and said journal update unit of said target secondary system continues writing said journal received from said first storage system, into said journal storage area of said target secondary system, while said storage device control unit of said target secondary system executes power saving on said storage device relating to said secondary logical volume.

2. The system according to claim 1, wherein:
assigned storage devices of the plurality of storage devices, which provide the secondary logical volume, are arranged as a RAID group; and
said storage device control unit executes power saving on said RAID group including said secondary logical volume, after said restoration processing is suspended.

3. The system according to claim 2, wherein:
a select secondary storage system of said at least two secondary storage systems, has:
 a plurality of secondary logical volumes; and
 said restore control unit for executing restoration processing, in which said one or more data element in said journal stored in said journal storage area is written into each secondary logical volume of said plurality of secondary logical volumes;
wherein said plurality of secondary logical volumes do not coexist with different secondary logical volumes, within a given RAID group.

4. The system according to claim 1, wherein said command unit transmits said power saving command when said journal usage rate is equal to or lower than a first threshold.

5. The system according to claim 1, wherein said command unit transmits a power saving cancellation command for canceling power saving in said storage device relating to said secondary logical volume, to said target secondary storage system, when said journal usage rate is equal to or higher than a second threshold,
 said reception unit of said target secondary storage system, receives said power saving cancellation command, and
 said storage device control unit of said target secondary storage system, cancels power saving in said storage device relating to said secondary logical volume, in response to reception of said power saving cancellation command.

6. A system comprising:
at least two secondary storage systems for each receiving from a first storage system, a journal including one or more data element that is written in a primary logical volume provided in the first storage system; and
each secondary storage system of said at least two secondary storage systems including:
 a journal storage area;
 a plurality of storage devices;
 a plurality of logical volumes, including a secondary logical volume, formed in a storage space of said plurality of storage devices;
 a journal update unit for writing said journal received from said first storage system, into said journal storage area;
 a restore control unit for executing restoration processing, in which said one or more data element in said journal stored in said journal storage area, is written into said secondary logical volume;
 a first acquisition unit for obtaining a journal usage rate indicating an extent of usage of said journal storage area by said journal;
 a second acquisition unit for obtaining a journal addition rate relating to a total amount of journals added to said journal storage area per unit time; and
 a storage device control unit for controlling power saving on a storage device relating to said secondary logical volume;
wherein, in accordance with said journal usage rate and said journal addition rate satisfying predetermined conditions:
 said restore control unit suspends said restoration processing,
 said storage device control unit executes power saving in said storage device relating to said secondary logical volume, after said restoration processing is suspended, and,
 said journal storage area continues to operate in a non-power-saving mode, and said journal update unit continues writing said journal received from said first storage system, into said journal storage area, while said power saving is executed on said storage device relating to said secondary logical volume.

7. The system according to claim 6, wherein:
assigned storage devices of the plurality of storage devices, which provide the secondary logical volume, are arranged as a RAID group; and
said storage device control unit executes power saving on said RAID group including said secondary logical volume, after said restoration processing is suspended.

8. The system according to claim 7, wherein:
a select secondary storage system of said at least two secondary storage systems, has:
 a plurality of secondary logical volumes; and
 said restore control unit for executing restoration processing, in which said one or more data element in said journal stored in said journal storage area is written into each secondary logical volume of said plurality of secondary logical volumes;
wherein said plurality of secondary logical volumes do not coexist with different secondary logical volumes, within a given RAID group.

9. The system according to claim 6, wherein said storage device control unit executes said power saving command when said journal usage rate is equal to or lower than a first threshold.

10. A processor-implemented method implemented within a system which includes:
at least two secondary storage systems for each receiving from a first storage system, a journal including one or more data element that is written in a primary logical volume provided in the first storage system; and
a management device for managing said secondary storage system,
each secondary storage system of said at least two secondary storage systems including:
 a reception unit for receiving a command;
 a journal storage area;
 a plurality of storage devices;
 a plurality of logical volumes, including a secondary logical volume, formed in a storage space of said plurality of storage devices;
 a journal update unit for writing said journal received from said first storage system, into said journal storage area;
 a restore control unit for executing restoration processing, in which said one or more data element in said journal stored in said journal storage area is written into said secondary logical volume; and
 a storage device control unit for controlling said storage devices, and
said method comprising:
 obtaining, for said each secondary storage system of said at least two secondary storage systems, a journal usage rate indicating an extent of usage of said journal storage area by said journal;
 obtaining, for said each secondary storage system of said at least two secondary storage systems, a journal addition rate relating to a total amount of journals added to said journal storage area per unit time; and transmitting to a target secondary storage system of said at least two secondary storage systems, a power saving command for reducing the power consumption of a storage device relating to said target secondary logical volume, in accordance with said journal usage rate and said journal addition rate of said target secondary storage system, satisfying predetermined conditions, receiving said power saving command via said resection unit of said target secondary system, suspending said restoration processing via said restore control unit of said target secondary system, in response to reception of said power saving command, executing power saving on said storage device relating to said secondary logical volume of said target secondary system, via said storage device control unit, after said restoration processing is suspended, continuing to operate said journal storage area of said target secondary system in a non-power-saving mode, and continuing writing said journal received from said first storage system, via said journal update unit of said target secondary system, into said journal storage area of said target secondary system, while said storage device control unit of said target secondary system executes power saving on said storage device relating to said secondary logical volume.

11. The method according to claim 10, wherein:
assigned storage devices of the plurality of storage devices, which provide the secondary logical volume, are arranged as a RAID group; and
said executing power saving executes power saving on said RAID group including said secondary logical volume, after said restoration processing is suspended.

12. The method according to claim 11, wherein:
a select secondary storage system of said at least two secondary storage systems, has:
a plurality of secondary logical volumes; and
said executing restoration processing more specifically executes processing, in which said one or more data element in said journal stored in said journal storage area is written into each secondary logical volume of said plurality of secondary logical volumes;
wherein said plurality of secondary logical volumes do not coexist with different secondary logical volumes, within a given RAID group.

13. The method according to claim 10, wherein said executing power saving executes power saving when said journal usage rate is equal to or lower than a first threshold.

14. The method according to claim 10, wherein said command unit transmits a power saving cancellation command for canceling power saving in said storage device relating to said secondary logical volume, to said target secondary storage system, when said journal usage rate is equal to or higher than a second threshold,
said reception unit of said target secondary storage system, receives said power saving cancellation command, and
said storage device control unit of said target secondary storage system, cancels power saving in said storage device relating to said secondary logical volume, in response to reception of said power saving cancellation command.

15. A processor-implemented method implemented within a system which includes:
at least two secondary storage systems for each receiving from a first storage system, a journal including one or more data element that is written in a primary logical volume provided in the first storage system; and
each secondary storage system of said at least two secondary storage systems including:
a journal storage area;
a plurality of storage devices;
a plurality of logical volumes, including a secondary logical volume, formed in a storage space of said plurality of storage devices;
a journal update unit for writing said journal received from said first storage system, into said journal storage area;
a restore control unit for executing restoration processing, in which said one or more data element in said journal stored in said journal storage area, is written into said secondary logical volume;
a storage device control unit for controlling power saving on a storage device relating to said secondary logical volume;
said method comprising:
obtaining a journal usage rate indicating an extent of usage of said journal storage area by said journal;
obtaining a journal addition rate relating to a total amount of journals added to said journal storage area per unit time;
wherein, in accordance with said journal usage rate and said journal addition rate satisfying predetermined conditions:
said restore control unit suspends said restoration processing,
said storage device control unit executes power saving in said storage device relating to said secondary logical volume, after said restoration processing is suspended, and,
said journal storage area continues to operate in a non-power-saving mode, and said journal update unit continues writing said journal received from said first storage system, into said journal storage area, while said power saving is executed on said storage device relating to said secondary logical volume.

16. The method according to claim 15, wherein:
assigned storage devices of the plurality of storage devices, which provide the secondary logical volume, are arranged as a RAID group; and
said storage device control unit executes power saving on said RAID group including said secondary logical volume, after said restoration processing is suspended.

17. The method according to claim 16, wherein:
a select secondary storage system of said at least two secondary storage systems, has:
a plurality of secondary logical volumes; and
said restore control unit for executing restoration processing, in which said one or more data element in said journal stored in said journal storage area is written into each secondary logical volume of said plurality of secondary logical volumes;
wherein said plurality of secondary logical volumes do not coexist with different secondary logical volumes, within a given RAID group.

18. The method according to claim 15, wherein said storage device control unit executes said power saving command when said journal usage rate is equal to or lower than a first threshold.

* * * * *